(12) United States Patent
Ogata et al.

(10) Patent No.: US 10,930,923 B2
(45) Date of Patent: Feb. 23, 2021

(54) TOPOLOGICAL QUANTUM FRAMEWORK, COMPOSITE ANODE ACTIVE MATERIAL, ANODE, LITHIUM BATTERY, SEMICONDUCTOR, AND DEVICE COMPRISING THE TOPOLOGICAL QUANTUM FRAMEWORK, AND METHOD OF PREPARING THE TOPOLOGICAL QUANTUM FRAMEWORK

(71) Applicant: Samsung Electronics Co., Ltd., Suwon-si (KR)

(72) Inventors: Ken Ogata, Seongnam-si (KR); Dong-Su Ko, Seoul (KR); Seongho Jeon, Pohang-si (KR); Koichi Takei, Hwaseong-si (KR); Sungsoo Han, Hwaseong-si (KR); Junho Lee, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 325 days.

(21) Appl. No.: 15/860,932

(22) Filed: Jan. 3, 2018

(65) Prior Publication Data

US 2019/0044130 A1 Feb. 7, 2019

(30) Foreign Application Priority Data

Aug. 2, 2017 (KR) .................. 10-2017-0098070

(51) Int. Cl.
*H01M 4/13* (2010.01)
*H01M 4/36* (2006.01)
(Continued)

(52) U.S. Cl.
CPC .......... *H01M 4/364* (2013.01); *H01M 4/044* (2013.01); *H01M 4/0445* (2013.01);
(Continued)

(58) Field of Classification Search
CPC .... H01M 4/364; H01M 4/044; H01M 4/0445; H01M 4/0461; H01M 4/134;
(Continued)

(56) References Cited

U.S. PATENT DOCUMENTS 9,105,925 B2  8/2015 Kim et al.
9,142,833 B2  9/2015 Tolbert et al.
(Continued)

FOREIGN PATENT DOCUMENTS

EP      2927192 A1   10/2015
KR   1020160037784 A  4/2016
(Continued)

OTHER PUBLICATIONS

European Search Report for European Patent Application No. 18168582.7 dated Dec. 7, 2018.
(Continued)

*Primary Examiner* — Jane J Rhee
(74) *Attorney, Agent, or Firm* — Cantor Colburn LLP

(57) ABSTRACT

A topological quantum framework includes a plurality of one-dimensional nanostructures disposed in different directions and connected to each other, wherein a one-dimensional nanostructure of the plurality of one-dimensional nanostructures includes a first composition including a metal capable of incorporating and deincorporating lithium, and wherein the topological quantum framework is porous.

39 Claims, 15 Drawing Sheets
(4 of 15 Drawing Sheet(s) Filed in Color)

(51) Int. Cl.
*H01M 4/58* (2010.01)
*H01M 4/48* (2010.01)
*H01M 4/485* (2010.01)
*H01M 4/60* (2006.01)
*H01M 10/052* (2010.01)
*H01M 4/38* (2006.01)
*H01M 4/62* (2006.01)
*H01M 4/134* (2010.01)
*H01M 4/04* (2006.01)
*H01M 4/1395* (2010.01)
*H01M 4/02* (2006.01)
*G01N 27/12* (2006.01)

(52) U.S. Cl.
CPC ......... *H01M 4/0461* (2013.01); *H01M 4/134* (2013.01); *H01M 4/1395* (2013.01); *H01M 4/366* (2013.01); *H01M 4/386* (2013.01); *H01M 4/483* (2013.01); *H01M 4/485* (2013.01); *H01M 4/58* (2013.01); *H01M 4/5825* (2013.01); *H01M 4/60* (2013.01); *H01M 4/622* (2013.01); *H01M 4/625* (2013.01); *H01M 10/052* (2013.01); *G01N 27/127* (2013.01); *H01M 2004/021* (2013.01); *H01M 2004/027* (2013.01)

(58) Field of Classification Search
CPC .... H01M 4/1395; H01M 4/366; H01M 4/386; H01M 4/483; H01M 4/485; H01M 4/58; H01M 4/5825; H01M 4/60; H01M 4/622; H01M 4/625; H01M 2004/021; H01M 2004/027

See application file for complete search history.

(56) References Cited

U.S. PATENT DOCUMENTS

| | | |
|---|---|---|
| 10,243,207 B2 * | 3/2019 | Cao .................. B01J 23/72 |
| 2009/0291368 A1 | 11/2009 | Newman et al. |
| 2013/0252101 A1 | 9/2013 | Zhou et al. |
| 2013/0271085 A1 | 10/2013 | Chen et al. |
| 2016/0028089 A1 | 1/2016 | Arpin et al. |
| 2016/0149206 A1 * | 5/2016 | Liu .................. H01M 4/386 |
| | | 429/218.1 |
| 2017/0084913 A1 | 3/2017 | Misaki et al. |
| 2017/0294688 A1 | 10/2017 | Jang et al. |
| 2017/0346078 A1 | 11/2017 | Ogata et al. |

FOREIGN PATENT DOCUMENTS

| | | |
|---|---|---|
| KR | 101660414 B1 | 9/2016 |
| KR | 1020160137518 A | 11/2016 |
| KR | 1020170135593 A | 12/2017 |
| WO | 2014067891 A1 | 5/2014 |

OTHER PUBLICATIONS

Wang et al., "Brittle-to-ductile transition of lithiated silicon electrodes: Crazing to stable nanopore growth", J. Chem. Phys., 143, 2015 pp. 1-9.

* cited by examiner

20nm

TOPOLOGICAL QUANTUM FRAMEWORK, COMPOSITE ANODE ACTIVE MATERIAL, ANODE, LITHIUM BATTERY, SEMICONDUCTOR, AND DEVICE COMPRISING THE TOPOLOGICAL QUANTUM FRAMEWORK, AND METHOD OF PREPARING THE TOPOLOGICAL QUANTUM FRAMEWORK

CROSS-REFERENCE TO RELATED APPLICATION

This application claims priority to and the benefit of Korean Patent Application No. 10-2017-0098070, filed on Aug. 2, 2017, in the Korean Intellectual Property Office, and all the benefits accruing therefrom under 35 U.S.C. § 119, the content of which is incorporated herein by reference in its entirety.

BACKGROUND

1. Field

The present disclosure relates to a topological quantum framework, a composite anode active material including a topological quantum framework, an anode, a lithium battery, a semiconductor, and a device including a topological quantum framework, and a method of preparing a topological quantum framework.

2. Description of the Related Art

An example of an anode active material for a lithium battery is a carbonaceous material such as graphite. Graphite has excellent capacity retention and potential characteristics. Also, graphite does not undergo a volume change during intercalation/deintercalation of lithium, and thus the stability of a battery including graphite is high. A theoretical capacity of graphite is about 372 milliampere hours per gram (mAh/g), and an irreversible capacity of graphite can be suitably small.

As an anode active material for a lithium battery, a metal alloyable with lithium may be used. Examples of the metal alloyable with lithium include Si, Sn, and Al. An electrical capacity of the metal alloyable with lithium can be high. For example, the electrical capacity of the metal alloyable with lithium may be more than 10 times greater than the electrical capacity of graphite. However, because the metal alloyable with lithium undergoes a large volume expansion and shrinkage during a charging/discharging process, an active material particle can become isolated in an electrode. The large volume expansion and shrinkage can also result in increased surface area, which can result in increased electrolyte decomposition due to the increase in the specific surface area. As a result, lifetime characteristics of the battery including the metal alloyable with lithium are poor.

Therefore, it would be desirable to provide a material that is capable of suppressing deterioration of a battery while having improved capacity, e.g., comparable to a metal alloyable with lithium.

SUMMARY

Provided is a topological quantum framework having a novel structure.

Provided is a composite anode active material having improved life characteristics by including the topological quantum framework.

Provided is an anode including the composite anode active material.

Provided is a lithium battery including the anode.

Provided is a semiconductor capable of controlling a band gap by including the topological quantum framework.

Provided is a device including the semiconductor.

Provided is a method of preparing the topological quantum framework.

According to an aspect of an embodiment, a topological quantum framework includes: a plurality of one-dimensional nanostructures disposed in different directions and connected to each other, wherein a one-dimensional nanostructure of the plurality of one-dimensional nanostructures includes a first composition containing a metal capable of incorporating and deincorporating lithium, and wherein the topological quantum framework is porous.

According to an aspect of another embodiment, a composite anode active material includes the topological quantum framework, wherein the topological quantum framework comprises: a plurality of one-dimensional nanostructures disposed in different directions and connected to each other, wherein the plurality of one-dimensional nanostructures comprises a first composition comprising a metal capable of incorporating and deincorporating lithium, and wherein the topological quantum framework is porous.

According to an aspect of another embodiment, an anode includes the composite anode active material.

According to an aspect of another embodiment, a lithium battery includes the anode.

According to an aspect of another embodiment, a semiconductor includes the topological quantum framework.

According to an aspect of another embodiment, a device includes the semiconductor.

According to an aspect of another embodiment, a method of preparing a topological quantum framework includes: providing an anode including a metal capable of incorporating and deincorporating lithium; providing a lithium counter electrode and charging the anode up to about 20% to about 60% of a theoretical capacity of the anode to prepare a prelithiated anode; charging the prelithiated anode up to about 100% of the theoretical capacity of the anode in a battery including the prelithiated anode and a cathode to prepare a lithiated anode; and discharging the lithiated anode to obtain an electrode including a topological quantum framework.

Additional aspects will be set forth in part in the description which follows and, in part, will be apparent from the description, or may be learned by practice of the presented embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of the embodiments, taken in conjunction with the accompanying drawings in which.

DETAILED DESCRIPTION

Figure 1A:
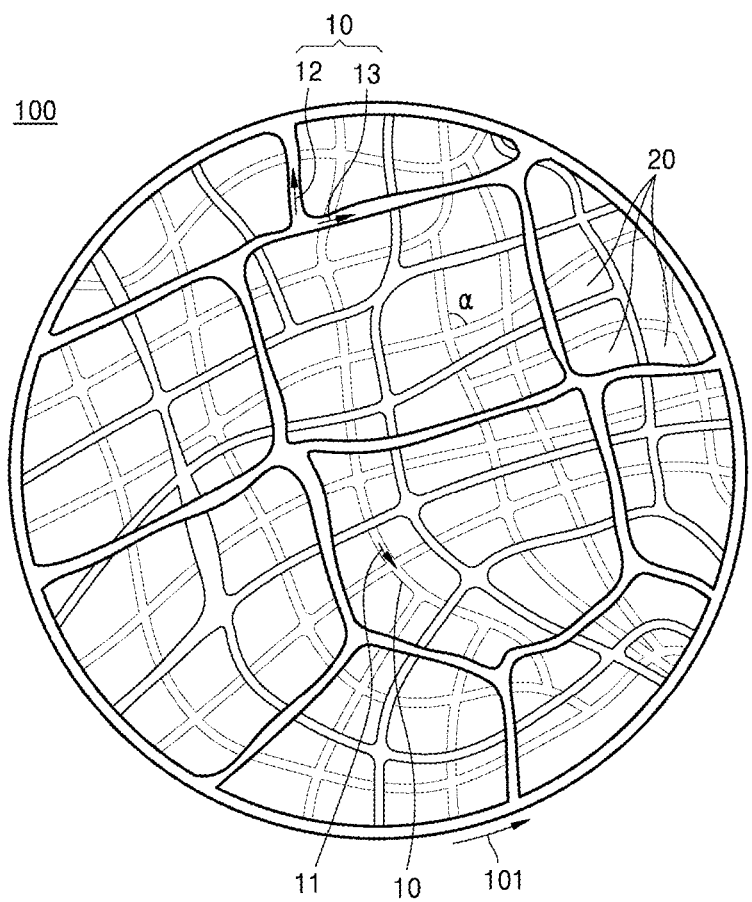
FIG. 1A is a schematic view of a topological quantum framework, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

As the disclosed concept allows for various changes and numerous embodiments, particular embodiments will be illustrated in the drawings and described in detail in the written description. However, this is not intended to limit this disclosure to particular modes of practice, and it is to be appreciated that all changes, equivalents, and substitutes that do not depart from the spirit and technical scope are encompassed in the present inventive concept.

The terms used in the present specification are merely used to describe particular embodiments, and are not intended to limit the present inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. As used herein, the symbol "/" may be interpreted as "and" or "or" according to the context.

Diameters, lengths, and thicknesses of elements, layers, and regions in the drawings may be exaggerated or diminished for convenience of explanation. Throughout the specification, like reference numerals in the drawings denote like elements. Throughout the specification, it will be understood that when a component, such as a layer, a film, a region, or a plate, is referred to as being "on" another component, the component can be directly on the other component or intervening components may be present thereon. In contrast, when an element is referred to as being "directly on" another element, there are no intervening elements present. Throughout the specification, while such terms as "first," "second," etc., may be used to describe various components, such components should not be limited to the above terms. The above terms are used only to distinguish one component from another. In the drawings some elements may be omitted in the description, for illustrative clarity, but this is not intended to exclude the omitted elements. Thus, "a first element," "component," "region," "layer," or "section" could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, according to an embodiment, a topological quantum framework (TQF), a composite anode active material, an anode, a lithium battery, a semiconductor, and a device including the TQF, and a method of preparing the TQF will be described in further detail.

As used herein, the term "framework" denotes a three-dimensional structure having a constant structure, in which frames, each formed of a plurality of one-dimensional nanostructures, are connected to each other.

As used herein, the term "topological" denotes that a plurality of one-dimensional nanostructures are arranged to have a constant relationship in space.

As used herein, the term "metal" includes the metal and metalloid elements of the Periodic Table of Elements selected from Groups 1 to 17, including the lanthanide elements and the actinide elements.

"Metalloid" means B, Si, Ge, As, Sb, Te, or a combination thereof.

As used herein, the term "composite" refers to a material formed by combining two or more materials having different physical and/or chemical properties, wherein the composite has properties different from each material constituting the composite individually, and wherein particles or wires of each material are at least microscopically separated and distinguishable from each other in a finished structure of the composite. In the composite, the components have a constant bonding relationship formed by a mechanical-chemical, electrical-chemical, and/or chemical reaction that may different than that obtained by a simple mixing. That is, a composite is not a state in which a plurality of components having different properties are simply mixed and physically contact each other. For example, the term "composite anode active material" denotes an anode active material obtained by a mechanical-chemical, electrical-chemical, and/or chemical reaction.

According to an embodiment, the topological quantum framework (TQF) includes a plurality of one-dimensional (1-dimensional) nanostructures that are connected to each other, wherein 1-dimensional nanostructures of the plurality of 1-dimensional nanostructures extend in different directions, and includes a first composition containing a metal capable of incorporating and deincorporating lithium, and wherein the TQF is porous. The TQF is a three-dimensional (3-dimensional) nanostructure in which each 1-dimensional nanostructure of the plurality of 1-dimensional nanostructures are arranged in an arbitrary manner (e.g., random direction) and are connected to each other.

When the TQF includes a plurality of 1-dimensional nanostructures and has a porous structure, the TQF may be evenly mixed and distributed together with other components such as a conducting agent and a binder. Also, volume change of the TQF may be suppressed during a charging and discharging process, and additional lithium consumption according to the volume change may be suppressed, resulting in an improvement in the charging/discharging characteristics of a lithium battery.

The TQF including the plurality of 1-dimensional nanostructures may easily absorb the volume change occurring in the 1-dimensional nanostructures during a charging and discharging process. Accordingly, the TQF may suppress deterioration in the lifetime characteristics of a lithium battery since cracks in the 1-dimensional nanostructures are suppressed during a charging and discharging process. Also, the TQF may suppress deterioration of charging/discharging effects on a lithium battery both before and after a long-term charging and discharging process.

Figure 1B:
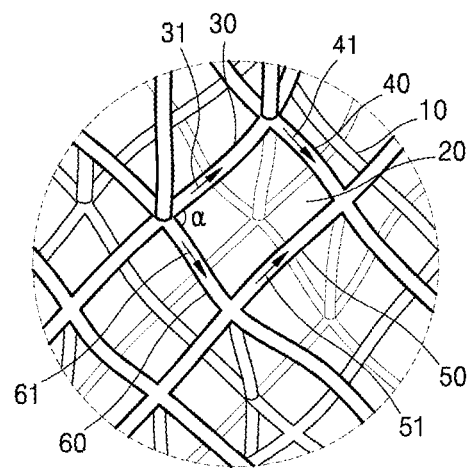
FIG. 1B is an enlarged schematic view of a portion of the topological quantum framework of FIG. 1A.
Figure 1C:
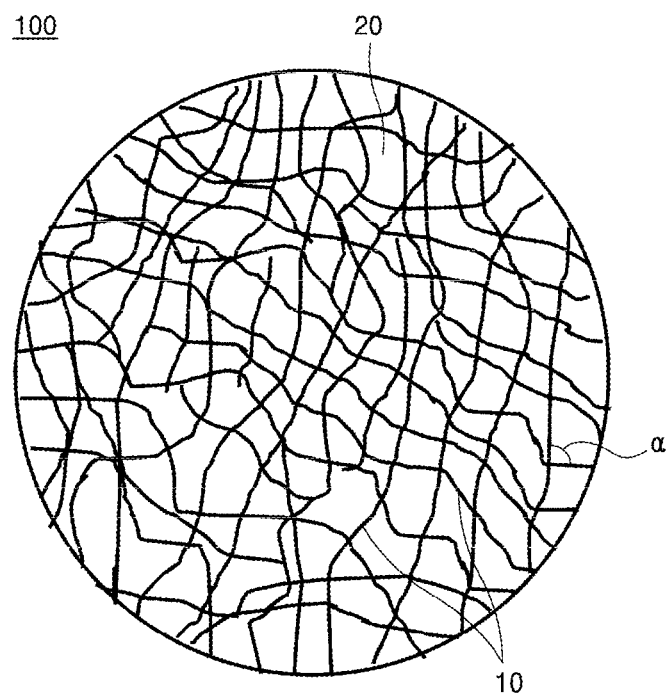
FIG. 1C is a schematic perspective two-dimensional view of the topological quantum framework of FIG. 1A.
Figure 1D:
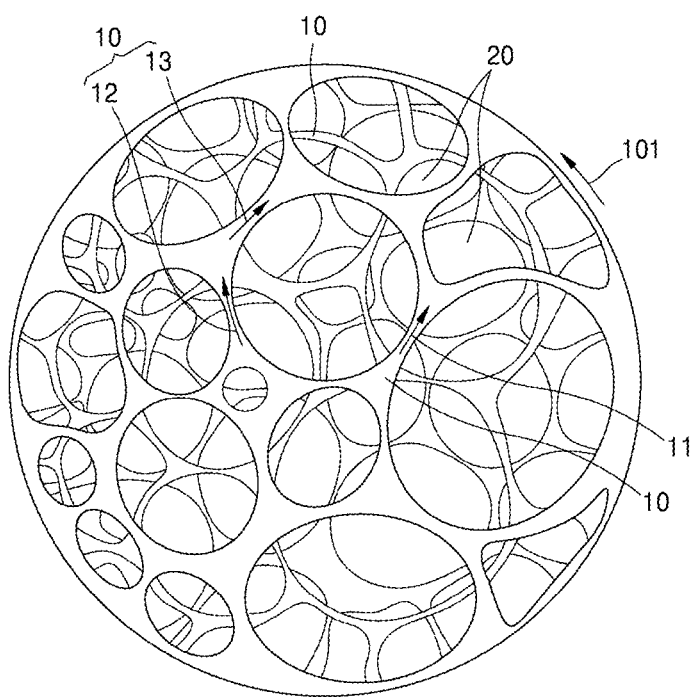
FIG. 1D is a schematic view of a topological quantum framework, according to another embodiment.
Figure 1E:
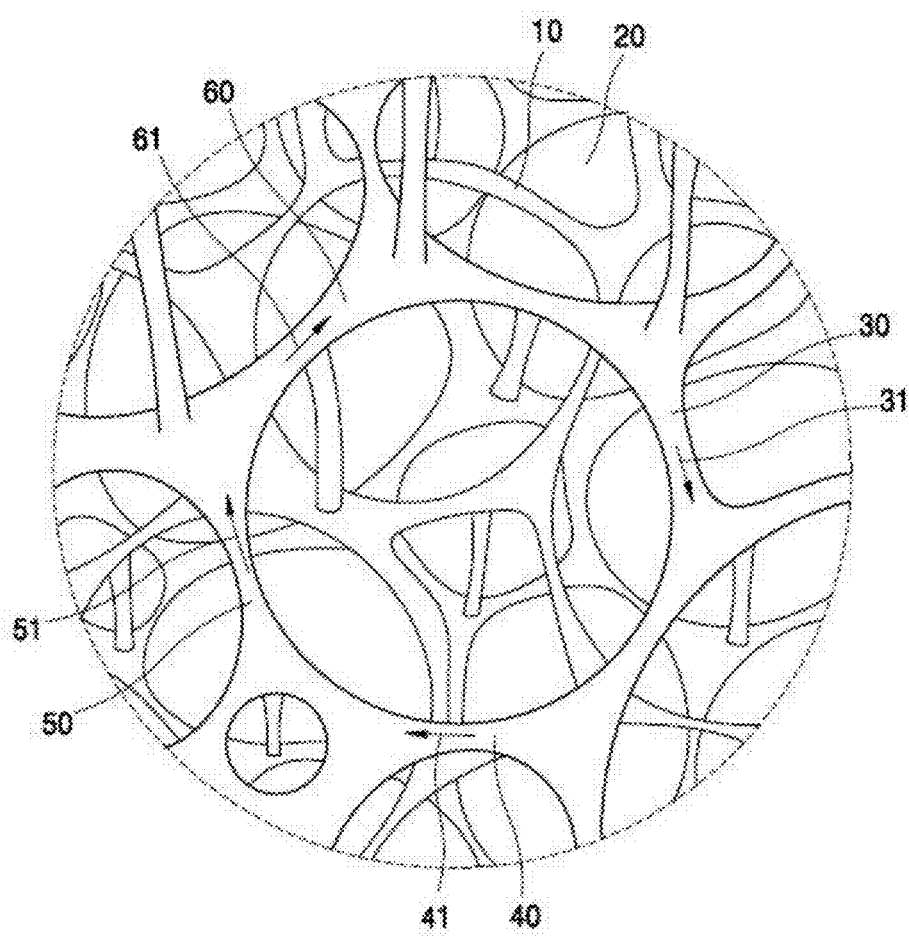
FIG. 1E is an enlarged schematic view of a portion of the topological quantum framework of FIG. 1D.
Figure 1F:
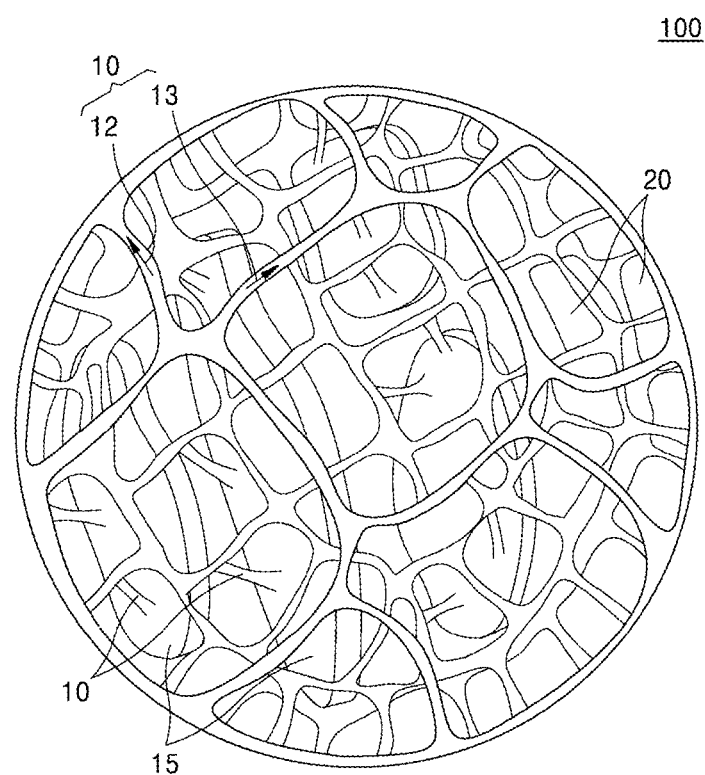
FIG. 1F is a schematic view of a topological quantum framework, according to another embodiment.

FIGS. 1A, 1D, and 1F are schematic views of a topological quantum framework 100 according to various embodiments. FIG. 1B is an enlarged schematic view of a portion of the topological quantum framework 100 of FIG. 1A. FIG. 1C is a schematic two-dimensional (2-dimensional), perspective view illustrating the topological quantum framework 100 of FIG. 1A. FIG. 1E is an enlarged schematic view of the inside of the topological quantum framework 100 of FIG. 1D. Referring to FIGS. 1A to 1F, the topological quantum framework 100 is formed of a plurality of 1-dimensional nanostructures 10 arranged in different (e.g., random) directions 12 and 13, and which are connected to each other, and has a porous structure including a plurality of pores 20.

Referring to FIGS. 1B, 1D, and 1E, the plurality of 1-dimensional nanostructures 10, 30, 40, 50, and 60 arranged in different directions 12, 13, 31, 41, 51, and 61 on a surface and inside the topological quantum framework 100 are connected.

As used herein, the term "nanostructure" refers to a material having a least one dimension (e.g., a diameter or a thickness) which is on a nanoscale level, i.e., a dimension of less than about 1000 nanometers, or about 1 nm to about 1000 nm, about 2 nm to about 800 nm, or about 4 nm to about 600 nm.

The 1-dimensional nanostructure refers to a nanostructure having a size in one dimension that is significantly greater than a size of other dimensions. In the 1-dimensional nanostructure, a measure of a length direction (x-direction) may be significantly greater than a measure of a diameter directions (y and z directions). For example, the 1-dimensional nanostructure may have a length of about 20 nanometers (nm) or greater and a diameter of less than about 10 nm. For example, the 1-dimensional nanostructure may be a 1-dimensional nanowire, a 1-dimensional nanofiber, or a 1-dimensional nanofilament, but embodiments are not limited thereto, and any material available as a 1-dimensional nanostructure in the art may be used.

An average diameter of the 1-dimensional nanostructure in the topological quantum framework 100 may be about 5 nm or less. An average diameter of the 1-dimensional nanostructure may be in a range of about 0.1 nm to about 4.5 nm, about 0.1 nm to about 4 nm, about 0.1 nm to about 3.5 nm, about 0.1 nm to about 3 nm, about 0.1 nm to about 2.5 nm, about 0.1 nm to about 2 nm, about 0.1 nm to about 1.5 nm, or about 0.1 nm to about 1 nm. When the 1-dimensional nanostructure has an average diameter of about 5 nm or less, the charging/discharging characteristics of a lithium battery may improve.

A standard deviation in the average diameter of the 1-dimensional nanostructure in the topological quantum framework 100 may be about 20% or less, about 18% or less, about 16% or less, about 14% or less, about 12% or less, about 10% or less, about 8% or less, about 6% or less, about 4% or less, or about 2% or less, e.g., about 0.1% to about 20%, about 0.5% to 15%, or about 1% to about 10%. When the average diameter of the 1-dimensional nanostructure has a small standard deviation, charging/discharging characteristics of a lithium battery may further improve. For example, a standard deviation in the average diameter of the 1-dimensional nanostructure having an average diameter of about 2 nm, may be about 0.4 nm or less.

Referring to FIGS. 1A and 1F, the 1-dimensional nanostructure 10 in the topological quantum framework 100 may be substantially linear, e.g., in a form of a straight line. The plurality of 1-dimensional nanostructures 10 may be in the form of a straight line (i.e., about 100% linearity), may be in the form of a curved line (i.e., 0% linearity), or may be a combination of a straight line form and a curved line form (i.e., a linearity of greater than 0 and less than 100%). The degree of linearity in the plurality of 1-dimensional nanostructures 10 may be about 10%, about 25%, about 50%, about 75%, about 80%, about 90%, about 95%, or about 100%, e.g., about 5% to about 90%, about 10% to about 80%, or about 20% to about 70%, based on the total length of the plurality of 1-dimensional nanostructure.

Referring to FIGS. 1A and 1D, a length direction 11 of a 1-dimensional nanostructure of the plurality of 1-dimensional nanostructures 10 in the topological quantum framework 100 may be different from a tangent-line direction 101 at a surface of the topological quantum framework 100 that is the closest (e.g., proximate or the most adjacent) to the 1-dimensional nanostructure 10.

Referring to FIGS. 1A to 1F, a 1-dimensional nanostructure of the plurality of 1-dimensional nanostructures 10 may intersect with and be connected to another 1-dimensional nanostructure on a surface of the topological quantum framework, on an inside of the topological quantum framework 100, or a combination thereof. When the 1-dimensional nanostructure of the plurality of 1-dimensional nanostructures 10 intersects another 1-dimensional nanostructure, a 2-dimensional or a 3-dimensional coordination network may be formed.

Referring to FIGS. 1A to 1C, an angle ($\alpha$) formed when one 1-dimensional nanostructure intersects another 1-dimensional nanostructure, may be in a range of about 20° to about 160°, about 30° to about 150°, about 40° to about 140°, about 50° to about 130°, about 60° to about 120°, about 70° to about 110°, or about 80° to about 100°.

Referring to FIGS. 1A to 1F, the topological quantum framework includes pores 20 defined by the plurality of 1-dimensional nanostructures 10, 30, 40, 50, and 60 connected within and on a surface of the topological quantum framework 100, and an average diameter of the pores 20 may be about 5 nm or less. For example, an average diameter of the pores 20 may be in a range of about 0.1 nm to about 4.5 nm, about 0.1 nm to about 4 nm, about 0.1 nm to about 3.5 nm, about 0.1 nm to about 3 nm, about 0.1 nm to about 2.5 nm, or about 0.1 nm to about 2 nm. When the pores 20 defined by the plurality of 1-dimensional nanostructures 10 have an average diameter of about 5 nm or less, charging/discharging characteristics of a lithium battery may be improved. In the topological quantum framework 100, an average diameter of the pores 20 defined by the 1-dimensional nanostructures may be greater than an average diameter of the 1-dimensional nanostructures 10. The diameter of the pores 20 refers to the maximum distance between the 1-dimensional nanostructures 10 that define the pore, i.e., the 1-dimensional nanostructures which are adjacent to each other but spaced apart from each other by the pores 20. The pores 20 in the topological quantum framework 100 are nanopores.

Referring to FIGS. 1B and 1E, in the topological quantum framework 100, a shape of the pore 20 (e.g., a cross-sectional shape of the pore 20) may be determined by a first 1-dimensional nanostructure 30 disposed in a first direction 31, a second 1-dimensional nanostructure 40 that crosses the first nanostructure 30 and is disposed in a second direction 41, a third 1-dimensional nanostructure 50 that crosses the second nanostructure 40 and is disposed in a third direction 51, and a fourth 1-dimensional nanostructure 60 that crosses the first nanostructure 30 and the third nanostructure 50 and is disposed in a fourth direction 61. Referring to FIGS. 1B and 1E, in the topological quantum framework 100, a shape of the pore 20 is determined by the plurality of 1-dimensional nanostructures 10 which define the pore. That is, the shape of the pore is determined by the shape and/or the direction of the 1-dimensional nanostructures closest to the pore 20, and thus the shape of the pore may vary according to the directions in which the plurality of 1-dimensional nanostructures 10 close to the pore 20 are disposed and/or according to a shape of the 1-dimensional nanostructures 10. The shape of the pore 20 may be determined by an angle ($\alpha$) at which the plurality of 1-dimensional nanostructures 10 closest to the pore 20 intersect one another. For example, a cross-section of the pore 20 may have a shape including a polygon such as a hexagon, a pentagon, a rectangle, or a triangle. That is, in the topological quantum framework 100, a cross-section of the pore 20 defined by the plurality of 1-dimensional nanostructures 10 that intersect one another may have a non-circular shape.

Referring to FIGS. 1D and 1E, in the topological quantum framework 100, a shape of the pore 20 (e.g., a cross-sectional shape of the pore 20) may be a circle or an oval. For example, a shape of the pore 20 may be determined by a 1-dimensional nanostructure 10 having a curved line form. That is, in the topological quantum framework 100, a circular pore or an elliptical pore refers to a pore having about 50% or more, about 60% or more, about 70% or more, about 80% or more, or about 90% or more, or about 100% of the pore formed by a curved line. In some embodiments, the pore is completely spherical or completely elliptical (i.e., 100% of the pore is formed by a 1-dimensional nanostructure having a curved line form). Also, although not shown in the drawing, in the topological quantum framework 100, the pores 20 may include both polygonal pores and non-polygonal pores. Also, although not shown in the drawings, in the topological quantum framework 100, the pores 20 may be formed by a 1-dimensional nanostructure having a combination of a curved line form and a straight line form (i.e., a 1-dimensional nanostructure including a portion which is straight and a portion which is curved). For example, nanospherical pores may be defined within the topological quantum framework 100. When a portion of a pore is formed by a curved line, a radius of curvature of the curved portion of the pore may be in a range of about 0.1 nm to about 100 nm, about 0.1 nm to about 90 nm, about 0.1 nm to about 80 nm, about 0.1 nm to about 70 nm, about 0.1 nm to about 60 nm, about 0.1 nm to about 50 nm, about 0.1 nm to about 40 nm, about 0.1 nm to about 30 nm, about 0.1 nm to about 20 nm, or about 0.1 nm to about 10 nm.

In an embodiment, in the topological quantum framework the cross-section of the pores may have a shape including a circle, an oval, a rectangle, a triangle, a pentagon, or a combination thereof.

Referring to FIG. 1F, the topological quantum framework 100 may further include a 2-dimensional nanostructure 15 disposed between the plurality of 1-dimensional nanostructures 10. At least one of the plurality of 1-dimensional nanostructures 10 may be connected to a top surface, a bottom surface, and/or a side surface of the 2-dimensional nanostructure 15. When the 2-dimensional nanostructure 15 is connected to the plurality of 1-dimensional nanostructures 10, a 2-dimensional or 3-dimensional coordination network may be formed. Also, the 2-dimensional nanostructure 15 may intersect at least one another 2-dimensional nanostructure 15. When the 2-dimensional nanostructure 15 is connected to a plurality of other 2-dimensional nanostructures, a 2-dimensional or a 3-dimensional coordination network may be formed. That is, the topological quantum framework 100 may include both a coordination network formed of the plurality of 1-dimensional nanostructures 10 and a coordination network formed of the plurality of 2-dimensional nanostructures 15 at the same time.

A thickness of the 2-dimensional nanostructure 15 may be about 5 nm or greater, about 10 nm or greater, about 15 nm or greater, or about 20 nm or greater. A thickness of the 2-dimensional nanostructure 15 may be in a range of about 5 nm to about 30 nm, about 5 nm to about 25 nm, about 5 nm to about 20 nm, about 6 nm to about 19 nm, about 7 nm to about 18 nm, about 8 nm to about 17 nm, about 9 nm to about 16 nm, or about 10 nm to about 15 nm. A length of the 2-dimensional nanostructure 15 may be about 20 nm or greater, about 25 nm or greater, about 30 nm or greater, about 35 nm or greater, about 40 nm or greater, about 45 nm or greater, about 50 nm or greater, about 55 nm or greater, about 60 nm or greater, about 65 nm or greater, about 70 nm or greater, about 75 nm or greater, about 80 nm or greater, about 85 nm or greater, about 90 nm or greater, about 95 nm or greater, or about 100 nm or greater. A length of the 2-dimensional nanostructure 15 may be in a range of about 20 nm to about 200 nm, about 25 nm to about 200 nm, about 30 nm to about 200 nm, about 35 nm to about 200 nm, about 40 nm to about 195 nm, about 45 nm to about 190 nm, about 50 nm to about 185 nm, about 55 nm to about 180 nm, about 60 nm to about 175 nm, about 65 nm to about 170 nm, about 70 nm to about 165 nm, about 75 nm to about 160 nm, about 80 nm to about 155 nm, about 85 nm to about 150 nm, about 90 nm to about 145 nm, about 95 nm to about 140 nm, or about 100 nm to about 140 nm. The length of the 2-dimensional nanostructure refers to the longest length among all possible lengths of the 2-dimensional nanostructure in a direction perpendicular to a thickness direction. The 2-dimensional nanostructure may have the same composition with that of the 1-dimensional nanostructure.

Referring to FIGS. 1A to 1F, in the topological quantum framework 100, an arrangement of the pores 20 may be non-periodical and/or disordered. Unlike foam having a periodical and ordered pore arrangement, the 3-dimensional porous nanostructure of the topological quantum framework may be non-periodical and/or disordered. Also, since the topological quantum framework 100 includes pores having various shapes such as a hexagon, a pentagon, a rectangle, or a triangle at the same time, shapes of individual pores may be different from each other and irregular. Therefore, the topological quantum framework 100 may differ from a prior art porous material including pores having a single, regular shape such as spherical pores.

Referring to FIGS. 1A to 1F, a porosity of the topological quantum framework 100 may be about 50% or greater. A porosity of the topological quantum framework 100 may be in a range of about 50% to about 99%, about 55% to about 99%, about 60% to about 99%, about 65% to about 99%, about 70% to about 99%, about 75% to about 99%, about 80% to about 99%, about 85% to about 99%, or about 90% to about 99%. Since the topological quantum framework 100 is formed of the plurality of 1-dimensional nanostructures 10 that are connected to each other, the topological quantum framework 100 may have a relatively high porosity. When the topological quantum framework 100 has a high porosity within the above ranges, charging/discharging characteristics of a lithium battery may be improved. The porosity refers to a measure of a volume of pores in the topological quantum framework relative to the total volume of the topological quantum framework 100. That is, the porosity is determined as a percentage of the volume of pores in the material based on the total volume of the material.

Referring to FIGS. 1A to 1F, the topological quantum framework 100 may be in the form of a porous particle (e.g., a porous nanoparticle). When the topological quantum framework 100 is in the form of a porous nanoparticle, the topological quantum framework 100 may be mixed with other components and easily molded into a different shape. For example, a slurry including the topological quantum framework and a solvent may be prepared, and then the slurry may be molded into various shapes.

Figure 2A:
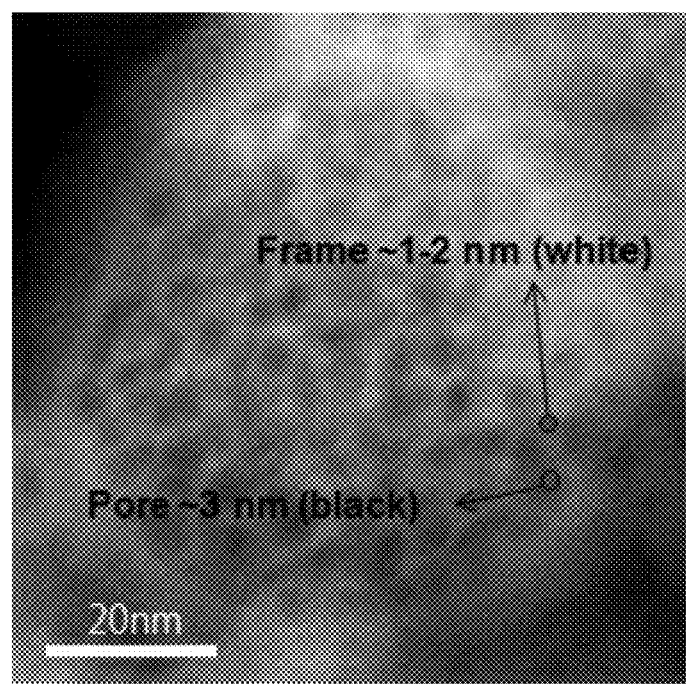
FIG. 2A is a high-angle annular dark field (HAADF) scanning transmission electron microscope (STEM) image of a topological quantum framework prepared in accordance with Example 1.
Figure 2B:
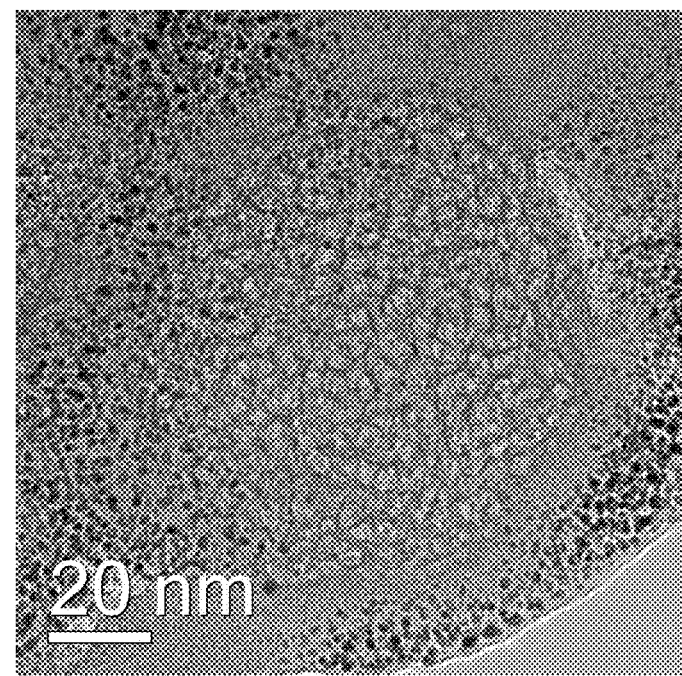
FIG. 2B is a transmission electron microscope (TEM) image of the topological quantum framework in FIG. 2A.
Figure 2C:
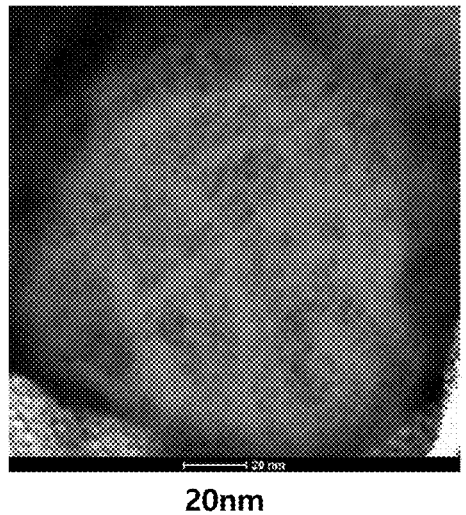
FIG. 2C is a HAADF STEM image of a topological quantum framework prepared in accordance with Example 2.

Referring to FIGS. 2A to 2C, the topological quantum framework in the form of a porous particle may be a spherical nanoparticle, for example, a nanoparticle having a spherical cage structure. A sphericity of the spherical particle may be about 0.7 or greater, about 0.75 or greater, about 0.8 or greater, about 0.85 or greater, about 0.9 or greater, about 0.91 or greater, about 0.92 or greater, about 0.93 or greater, about 0.94 or greater, about 0.95 or greater, about 0.96 or greater, about 0.97 or greater, about 0.98 or greater, or about 0.99 or greater. A sphericity of the spherical nanoparticle may be less than about 1.0. The sphericity is a ratio of a surface area of a porous nanoparticle, which is regarded as non-porous nanoparticle for a calculation of surface area of the porous nanoparticle, to a surface area of a sphere having the same volume. A sphericity of a complete sphere is 1, and a sphericity of the nanoparticle is greater than 0 to less than 1. To calculate a sphericity, the surface area of the porous nanoparticle is compared to a surface area of a non-porous nanoparticle having the same volume as the porous nanoparticle.

An aspect ratio of the porous nanoparticle may be about 4 or less, about 3.5 or less, about 3 or less, about 2.5 or less, about 2 or less, about 1.5 or less, about 1.3 or less, about 1.2 or less, or about 1.1 or less, e.g., about 0.1 to about 4, about 0.5 to about 3.5, or about 1 to about 3. An aspect ratio of the porous nanoparticle may be about 1 or greater. When the topological quantum framework is in the form of a porous spherical particle, an area of the topological quantum framework that contacts an electrolyte may be relatively large, and thus the rate characteristics (e.g., charging/discharging) of a lithium battery including the topological quantum framework may be improved.

Referring to FIGS. 2B and 2C, a diameter of the topological quantum framework may be about 200 nm or less. That is, a diameter of the nanoparticle including the topological quantum framework may be about 200 nm or less. A diameter of the topological quantum framework may be in a range of about 10 nm to about 200 nm, about 10 nm to about 180 nm, about 10 nm to about 160 nm, about 10 nm to about 140 nm, about 10 nm to about 120 nm, about 10 nm to about 100 nm, about 10 nm to about 90 nm, about 10 nm to about 80 nm, about 10 nm to about 70 nm, about 10 nm to about 60 nm, about 10 nm to about 50 nm, about 10 nm to about 40 nm, about 10 nm to about 30 nm, or about 10 nm to about 20 nm. When the topological quantum framework has a diameter within these ranges, charging/discharging characteristics of a lithium battery including the topological quantum framework may be improved.

In the topological quantum framework, the first composition containing a metal capable of incorporating and deincorporating lithium may have an amorphous structure. When the first composition has an amorphous structure, cracks that may be generated by a volume change which occurs during a charging/discharging process may be suppressed, compared to cases when a composition having a crystalline structure is used, and thus lifetime characteristics of a lithium battery including the topological quantum framework may improve.

In the topological quantum framework, the first composition included in the 1-dimensional nanostructure may include a metal and a Group 14 element having an atomic weight of 20 or higher. The metal may be a metal element selected from Group 1 to Group 13 elements. The metal may be Fe, Co, Mn, Ni, Au, Ag, Pt, Nb, Mo, V, Re, Ti, Ba, Li, Na, Mg, Ca, Al, or a combination of at least two selected therefrom.

In the topological quantum framework, the first composition included in the 1-dimensional nanostructure may include a metal (i.e., a semiconductor), a Group 14 element having an atomic weight of 20 or higher, and oxygen, nitrogen, carbon, or a combination thereof, i.e., being a semiconductor. For example, the semiconductor may be prepared by preparing a precursor composition including a metal and a Group 14 element having an atomic weight of 20 or higher, and reacting a gas including oxygen, nitrogen, carbon, or a combination thereof, with the precursor composition.

For example, in the topological quantum framework, the first composition may be a compound represented by Formula 1:

$$M_xSiQ_y \qquad \text{Formula 1}$$

In Formula 1, M includes Fe, Co, Mn, Ni, Au, Ag, Pt, Nb, Mo, V, Re, Ti, Ba, Li, Na, Mg, Ca, Al, or a combination thereof; Q is C, N, or O; and x and y satisfy $0 \leq x < 1$ and $0 \leq y < 2$.

For example, in the topological quantum framework, the first composition represented by Formula 1 may be a compound represented by Formulae 1a to 1d:

$$SiO_y \qquad \text{Formula 1a}$$

$$SiN_y \qquad \text{Formula 1b}$$

$$SiC_y \qquad \text{Formula 1c}$$

$$M_xSi \qquad \text{Formula 1d}$$

In Formulae 1a to 1d, M includes Fe, Co, Mn, Ni, Au, Ag, Pt, Nb, Mo, V, Re, Ti, Ba, Li, Na, Mg, Ca, Al, or a combination thereof; and x and y satisfy $0 < x < 1$ and $0 \leq y < 2$.

For example, the first composition included in the 1-dimensional nanostructure may be a metal silicide. Examples of the metal silicide may include $Fe_xSi$, $Co_xSi$, $Mn_xSi$, $Ni_xSi$, $Au_xSi$, $Ag_xSi$, $Pt_xSi$, $Nb_xSi$, $Mo_xSi$, $V_xSi$, $Re_xSi$, $Ti_xSi$, $Ba_xSi$, $Li_xSi$, $Na_xSi$, $Mg_xSi$, $Ca_xSi$, $Al_xSi$, or a combination thereof. In these metal silicides, x satisfies $0 < x \leq 1$.

The first composition included in the 1-dimensional nanostructure may include lithium and a Group 14 element having an atomic weight of 20 or greater. The Group 14 element having an atomic weight of 20 or greater may be silicon (Si), germanium (Ge), tin (Sn), or lead (Pb). For example, the first composition may include a lithium silicide. The 1-dimensional nanostructure may be a lithium silicide nanowire. The first composition included in the 1-dimensional nanostructure may include about 0.1 mole (mol) to about 1 mol of lithium and about 0.7 mol to about 1.3 mol of silicon based on 1 mol of the first composition. In the first composition included in the 1-dimensional nanostructure, an amount of silicon may be higher than an amount of lithium. The first composition does not include a transition metal that belongs to Group 3 to Group 12 of the periodic table. Thus, the first composition may be distinguished from a porous transition metal oxide.

For example, the lithium silicide included in the 1-dimensional nanostructure may be represented by Formula 2:

$$Li_xSi \qquad \text{Formula 2}$$

In Formula 2, x satisfies $0 < x < 1$.

The topological quantum framework may have a quantum confinement effect. As used herein, a quantum confinement effect refers to an increase in a band gap as compared to a bulk material having the same composition as the topological quantum framework. That is, a band gap of the topological quantum framework is greater than a band gap of a bulk material having the same composition as the topological quantum framework. The band gap may be easily controlled by changing a diameter of the 1-dimensional nanostructure included in the topological quantum framework. In the topological quantum framework, the 1-dimensional nanostructure may further include a dopant. When the 1-dimensional nanostructure further includes a dopant, a conductivity of the topological quantum framework may be controlled, and thus a band gap of the topological quantum framework may be controlled so that the topological quantum framework may have properties of a semiconductor.

The topological quantum framework may further include a coating layer disposed on a surface thereof. The coating layer may include a residual lithium compound including $Li_2CO_3$, $Li_2O$, $Li_2C_2O_4$, LiOH, LiX, $ROCO_2Li$, $HCOLi$, ROLi, $(ROCO_2Li)_2$, $(CH_2OCO_2Li)_2$, $Li_2S$, $Li_xSO_y$, or a combination thereof, but embodiments are not limited thereto, and any material available as a residual lithium compound may be present. In the residual lithium compound, X may be F, Cl, I, or Br; R may be a C1-C20 hydrocarbon group; x may be in a range of 0 to 1; and y may be in a range of 1 to 4. For example, R may be a methyl group, an ethyl group, a propyl group, or a butyl group, but embodiments are not limited thereto, and any functional group available as a hydrocarbon group in the art may be used.

According to another embodiment, a composite anode active material includes the topological quantum framework. The composite anode active material including the topological quantum framework may be mixed with a conducting agent and a binder and may provide improved lifetime characteristics and charging/discharging efficiency since the volume change during a charging/discharging process is suppressed.

According to another embodiment an anode includes the composite anode active material. The anode may be prepared by molding an anode active material composition including the composite anode active material and a binder into a predetermined shape or coating the anode active material composition on a current collector of a copper foil.

For example, the composite anode active material, a conducting agent, a binder, and a solvent are mixed to prepare an anode active material composition. In some embodiments, the anode active material composition may be directly coated on a metallic current collector and dried to prepare an anode plate. In some embodiments, the anode active material composition may be cast on a separate support to form an anode active material film, which may then be separated from the support and laminated on a metallic current collector to prepare an anode plate. The anode is not limited to the examples described above, and may be one of a variety of types.

The anode active material composition may further include a carbonaceous anode active material in addition to the composite anode active material. Examples of the carbonaceous anode active material may include natural graphite, artificial graphite, graphene, carbon black, fullerene soot, carbon nanotubes, carbon fibers, or a combination thereof, but embodiments are not limited thereto, and any material suitable for use as a carbonaceous anode active material may be used.

Examples of the conducting agent may include a carbonaceous material such as carbon black, acetylene black, ketjen black, natural graphite, artificial graphite, or carbon fibers; a metallic material such as a metal powder or metal fibers of copper, nickel, aluminum, or silver; or a conductive polymer such as a polyphenylene derivative or a mixture thereof, but embodiments are not limited thereto, and any material suitable for use as a conducting agent may be used. A combination comprising at least two of the foregoing may also be used.

Examples of the binder may include a vinylidenefluoride/hexafluoropropylene copolymer, polyvinylidene fluoride (PVDF), polyacrylonitrile, polymethylmethacrylate, polytetrafluoroethylene, a styrene butadiene rubber-based polymer, or a combination thereof, but embodiments are not limited thereto, and any material suitable for use as a binder may be used.

Examples of the solvent may include N-methylpyrrolidone, acetone, and water, but embodiments are not limited thereto, and any material suitable for use as a solvent may be used.

The amounts of the composite anode active material, the conducting agent, the binder, and the solvent may be determined by a person of skill in the art without undue experimentation. The conducting agent, the binder, and/or the solvent may be omitted according to the use and the structure of the lithium battery.

According to another embodiment, a lithium battery includes the anode including the composite anode active material. The lithium battery may be manufactured in the following manner.

First, an anode is provided or may be prepared according to the anode preparation method described above.

Next, a cathode active material, a conducting agent, a binder, and a solvent are combined (e.g., mixed) to prepare a cathode active material composition. In some embodiments, the cathode active material composition may be directly coated on a metallic current collector to prepare a cathode plate. In some embodiments, the cathode active material composition may be cast on a separate support to form a cathode active material film, which may then be separated from the support and laminated on a metallic current collector to prepare a cathode plate.

The cathode active material may include lithium cobalt oxide, lithium nickel cobalt manganese oxide, lithium nickel cobalt aluminum oxide, lithium iron phosphate, lithium manganese oxide, or a combination thereof, but embodiments are not limited thereto, and any material suitable for use as a cathode active material may be used.

In some embodiments, the cathode active material may be a compound represented by the following formulae: $Li_aA_{1-b}B'_bD'_2$ (where $0.90 \leq a \leq 1.8$, and $0 \leq b \leq 0.5$); $Li_aE_{1-b}B'_bO_{2-c}D'_c$ (where $0.90 \leq a \leq 1.8$, $0 \leq b \leq 0.5$, and $0 \leq c \leq 0.05$); $LiE_{2-b}B'_b)_{4-c}D'_c$ (where $0 \leq b \leq 0.5$, and $0 \leq c \leq 0.05$); $Li_aNi_{1-b-c}Co_bB'_cD'_a$ (where $0.90 \leq a \leq 1.8$, $0 \leq b \leq 0.5$, $0 \leq c \leq 0.05$, and $0 < a \leq 2$); $Li_aNi_{1-b-c}Co_bB'_cO_{2-a}F'_a$ (where $0.90 \leq a \leq 1.8$, $0 \leq b \leq 0.5$, $0 \leq c \leq 0.05$, and $0 < a < 2$); $Li_aNi_{1-b-c}Co_bB'_cO_{2-a}F'2$ (where $0.90 \leq a \leq 1.8$, $0 \leq b \leq 0.5$, $0 \leq c \leq 0.05$, and $0 \leq a \leq 2$); $Li_aNi_{1-b-c}Mn_bB'_cD'_a$ (where $0.90 \leq a \leq 1.8$, $0 \leq b \leq 0.5$, $0 \leq c \leq 0.05$, and $0 < a < 2$); $Li_aNi_{1-b-c}Mn_bB'_cO_{2-a}F'_a$ (where $0.90 \leq a \leq 1.8$, $0 \leq b \leq 0.5$, $0 \leq c \leq 0.05$, and $0 < a < 2$); $Li_aNi_{1-b-c}Mn_bB'_cO_{2-a}F'2$ (where $0.90 \leq a \leq 1.8$, $0 \leq b \leq 0.5$, $0 \leq c \leq 0.05$, and $0 < a < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$.); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$.); $Li_aNiG_bO_2$ (where $0.90 \leq a \leq 1.8$, and $0.001 \leq b \leq 0.1$.); $Li_aCoG_bO_2$ (where $0.90 \leq a \leq 1.8$, and $0.001 \leq b \leq 0.1$.); $Li_aMnG_bO_2$ (where $0.90 \leq a \leq 1.8$, and $0.001 \leq b \leq 0.1$.); $Li_aMn_2GbO_4$ (where $0.90 \leq a \leq 1.8$, and $0.001 \leq b \leq 0.1$.); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$. A combination comprising at least two of the foregoing may also be used.

In the formulae above, A may include nickel (Ni), cobalt (Co), manganese (Mn), or a combination thereof; B' may include aluminum (Al), nickel (Ni), cobalt (Co), manganese (Mn), chromium (Cr), iron (Fe), magnesium (Mg), strontium (Sr), vanadium (V), a rare earth element, or a combination thereof; D' may include oxygen (O), fluorine (F), sulfur (S), phosphorus (P), or a combination thereof; E may include cobalt (Co), manganese (Mn), or a combination thereof; F' may include fluorine (F), sulfur (S), phosphorus (P), or a combination thereof; G may include aluminum (Al), chromium (Cr), manganese (Mn), iron (Fe), magnesium (Mg), lanthanum (La), cerium (Ce), strontium (Sr), vanadium (V), or a combination thereof; Q may include titanium (Ti), molybdenum (Mo), manganese (Mn), or a combination thereof; I' may include chromium (Cr), vanadium (V), iron (Fe), scandium (Sc), yttrium (Y), or a combination thereof; and J may include vanadium (V), chromium (Cr), manganese (Mn), cobalt (Co), nickel (Ni), copper (Cu), or a combination thereof.

The compounds listed above as cathode active materials may further include a surface coating layer (hereinafter, also referred to as "coating layer"). Alternatively, a mixture of a compound without a coating layer and a compound having a coating layer, the compounds being selected from the compounds listed above, may be used. In some embodiments, the coating layer may include a compound of a coating element including an oxide, a hydroxide, an oxyhydroxide, an oxycarbonate, and a hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. In some embodiments, the coating layer may be formed using any method that does not adversely affect the physical properties of the cathode active material. For example, the coating layer may be formed using a spray coating method, or a dipping method. The methods of forming the coating layer are understood by one of ordinary skill in the art, and thus a detailed description thereof will be omitted.

In some embodiments, the cathode active material may be $LiNiO_2$, $LiCoO_2$, $LiMn_xO_{2x}$ (where x=1 or 2), $LiNi_{1-x}Mn_xO_2$ (where 0<x<1), $LiNi_{1-x-y}Co_xMn_yO_2$ (where $0 \le x \le 0.5$ and $0 \le y \le 0.5$), $LiFePO_4$, $V_2O_5$, TiS, or MoS.

The conducting material, the binder, and the solvent used to prepare the cathode active material composition may be the same as those included in the anode active material composition. In some cases, a plasticizer may be further added to the cathode active material composition and/or to the anode active material composition in order to form pores in a corresponding electrode plate.

The amounts of the cathode active material, the conducting material, the binder, and the solvent may be determined by one of ordinary skill in the art without undue experimentation. The conducting agent, the binder, and/or the solvent may be omitted from the cathode active material composition according to the use and the structure of the lithium battery.

Next, the separator to be disposed between the cathode and the anode may be prepared. The separator for the lithium battery may be any separator that is suitable for use in lithium batteries. In some embodiments, the separator may have low resistance to migration of ions in an electrolyte and have an excellent electrolyte-retaining ability. Examples of the separator include glass fiber, polyester, Teflon, polyethylene, polypropylene, polytetrafluoroethylene (PTFE), or a combination thereof, each of which may be a non-woven or woven fabric. For example, a rollable separator including polyethylene and/or polypropylene may be used for a lithium ion battery. A separator with good organic electrolytic solution-retaining ability may be used for a lithium ion polymer battery. For example, the separator may be manufactured in the following manner.

In some embodiments, a polymer resin, a filler, and a solvent may be mixed together to prepare a separator composition. The separator composition may be directly coated on an electrode and then dried to form the separator. In some embodiments, the separator composition may be cast on a support and then dried to form a separator film, which may then be separated from the support and laminated on an electrode to form the separator.

The polymer resin used to manufacture the separator may be any material that is suitable for use as a binder for electrode plates. Examples of the polymer resin are a vinylidenefluoride/hexafluoropropylene copolymer, polyvinylidene fluoride (PVDF), polyacrylonitrile, polymethylmethacrylate, and a mixture thereof.

Then, an electrolyte is prepared.

In some embodiments, the electrolyte may be an organic electrolyte solution. In some embodiments, the electrolyte may be in a solid phase. Examples of the electrolyte are boron oxide and lithium oxynitride, but embodiments are not limited thereto. Any material suitable as a solid electrolyte may be used. In some embodiments, the solid electrolyte may be formed on the anode by, for example, sputtering.

In some embodiments, the organic electrolyte solution may be prepared by dissolving a lithium salt in an organic solvent.

The organic solvent is not limited and may be any suitable organic solvent. In some embodiments, the organic solvent may include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxolane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, or a combination thereof.

In some embodiments, the lithium salt is not limited and may be any material suitable for use as a lithium salt. In some embodiments, the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are each independently a natural number), LiCl, LiI, or a combination thereof.

Figure 6:
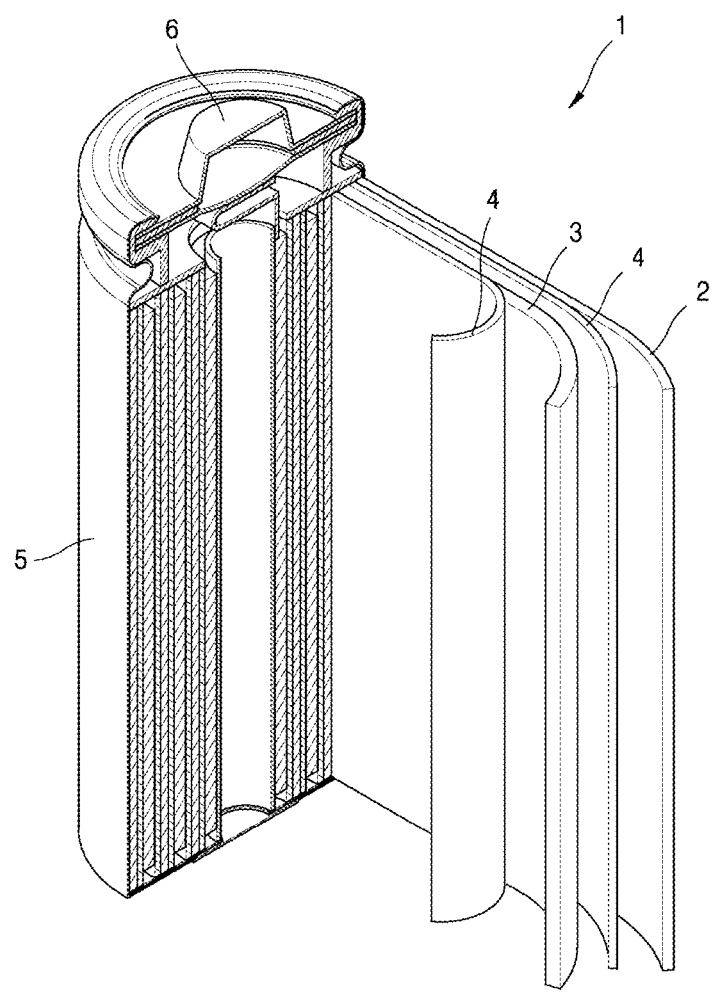
FIG. 6 is a schematic view of a lithium battery according to an embodiment.

As shown in FIG. 6, a lithium battery 1 includes a cathode 3, an anode 2, and a separator 4. In some embodiments, the cathode 3, the anode 2, and the separator 4 may be wound or folded, and then sealed in a battery case 5. In some embodiments, the battery case 5 may be filled with an organic electrolytic solution and sealed with a cap assembly 6, thereby completing the manufacture of the lithium battery 1. In some embodiments, the battery case 5 may be a cylindrical type, a rectangular type, or a thin-film type. For example, the lithium battery 1 may be a thin-film type battery. In some embodiments, the lithium battery 1 may be a lithium ion battery.

In some embodiments, the separator may be disposed between the cathode and the anode to form a battery assembly. In some embodiments, the battery assembly may be stacked in a bi-cell structure and impregnated with an organic electrolytic solution. In some embodiments, the resultant assembly may be put into a pouch and hermetically sealed, thereby completing the manufacture of a lithium ion polymer battery.

In some embodiments, a plurality of battery assemblies may be stacked to form a battery pack, which may be used in any device for which high capacity and high output are desired, for example, in a laptop computer, a smart phone, or an electric vehicle.

The lithium battery may have improved lifetime characteristics and high rate characteristics, and thus may be used in an electric vehicle (EV), for example, in a hybrid vehicle such as a plug-in hybrid electric vehicle (PHEV).

A capacity retention rate of a lithium battery including the composite anode active material may be about 70% or higher within a voltage range of about 3.0 volts (V) to about 4.0 V versus lithium metal after 300 cycles. Thus, the lithium battery may have an improved discharge capacity compared to a lithium battery including a prior art carbonaceous anode active material and may provide improved lifetime characteristics compared to those of a prior art metal alloyable with lithium anode active material.

According to another embodiment, a semiconductor includes the topological quantum framework. A diameter of a 1-dimensional nanostructure of the plurality of 1-dimensional nanostructure, or a type and an amount of a dopant in the topological quantum framework, may be changed to provide a semiconductor having desired properties such as a band gap or a conductivity.

For example, the semiconductor including the topological quantum framework may have a composition represented by one of Formulae 1a to 1c:

  $SiO_y$  Formula 1a

  $SiN_y$  Formula 1b

  $SiC_y$  Formula 1c

In Formulae 1a to 1c, y satisfies $0 \leq y < 2$.

According to another embodiment, a device includes the semiconductor. When a device includes the semiconductor, the device may have excellent performance. The device including the semiconductor may be an energy storage device, a light absorption device, or a thermoelectric device, but embodiments are not limited thereto, and any device including a semiconductor may be used.

According to another embodiment, an illuminant includes the topological quantum framework. A diameter or a thickness of the 1-dimensional nanostructures and/or the 2-dimensional nanostructures in the topological quantum framework or a type and an amount of a dopant in the topological quantum framework may be changed to provide an illuminant having the desired luminating characteristics.

According to another embodiment, a sensor includes the topological quantum framework. A diameter or a thickness of the 1-dimensional nanostructures and/or the 2-dimensional nanostructures in the topological quantum framework or a type and an amount of a dopant in the topological quantum framework may be changed to provide a sensor having desired conductivity characteristics, resistance characteristics, and thermoelectric characteristics.

According to another embodiment, a drug delivery system includes the topological quantum framework. A diameter or a thickness of the 1-dimensional nanostructures and/or the 2-dimensional nanostructures in the topological quantum framework, or a type and an amount of a dopant in the topological quantum framework, may be changed to provide a drug delivery system producing the desired drug delivery effects.

According to another embodiment, an actuator includes the topological quantum framework. A diameter or a thickness of the 1-dimensional nanostructures and/or the 2-dimensional nanostructures in the topological quantum framework, or a type and an amount of a dopant in the topological quantum framework, may be changed to provide an actuator having the desired conductivity characteristics, resistance characteristics, and thermoelectric characteristics.

According to another embodiment, a method of preparing a topological quantum framework includes providing (e.g., preparing) an anode including a metal capable of incorporating and deincorporating lithium; providing a lithium counter electrode and charging the anode up to about 20% to about 60% of a theoretical capacity (state of charge: SOC) of the anode to prepare a prelithiated anode; charging the prelithiated anode up to about 100% of an SOC of the theoretical capacity of the anode in a battery including the prelithiated anode and a cathode, to prepare a lithiated anode; and discharging the lithiated anode to obtain an electrode including a topological quantum framework. A structure and a composition of the topological quantum framework thus prepared may refer to the description provided above.

In the step of providing a lithium counter electrode and charging the anode up to about 20% to about 60% of a theoretical capacity (SOC) of the anode to prepare a prelithiated anode, when an amount of lithium is too low or too high compared to the theoretical capacity, the topological quantum framework may not have a stable structure.

The step of preparing the prelithiated anode by charging the anode up to about 20% to about 60% of a theoretical capacity (SOC) of the anode, may be performed in an electrochemical cell. The electrochemical cell is not particularly limited but may be, for example, a 2-electrode system or a 3-electrode system. The 3-electrode system may further include a reference electrode. The electrochemical cell includes an electrolyte solution in which the electrodes are impregnated, and a separator may be added if desired. The electrolyte solution may be any electrolyte solution that is generally used in a lithium battery, for example, as described above. The prelithiated anode may be prepared in the same manner used to prepare an electrode used as an anode of a lithium battery. The anode preparation method may refer to the method of preparing a lithium battery described above.

In the preparation of the lithiated anode, the prelithiated anode is charged to about 100% of an SOC of the anode in a battery including the prelithiated anode and a cathode, and a compound including an excessive amount of lithium may be formed. Subsequently, when the lithiated anode is delithiated (i.e., discharged), pores may be formed as the lithium is deintercalated from the compound, and thus a topological quantum framework having a porous structure is formed. During the process of charging the prelithiated anode up to about 100% of an SOC of the anode and discharging (i.e., delithiating) the lithiated anode, a voltage of the lithium battery may be in a range of greater than 0 V to about 2.5 V versus lithium metal. The process of charging the prelithiated anode up to about 100% of an SOC of the anode and discharging (i.e., delithiating) the lithiated anode may be repeated 1 to 10 times.

In the method of preparing a topological quantum framework an N/P ratio, which is a capacity ratio of the anode to the cathode in the battery including the prelithiated anode and the cathode, may be in a range of about 1.2 to about 1.6, about 1.25 to about 1.6, about 1.3 to about 1.6, about 1.35 to about 1.6, about 1.4 to about 1.6, or about 1.45 to about 1.55. When the N/P ratio is too low or too high, the topological quantum framework may not have a stable structure.

In the method of preparing a topological quantum framework, the metal capable of incorporating and deincorporating lithium may include a Group 14 metal element. The Group 14 metal element may be silicon (Si), germanium (Ge), tin (Sn), or lead (Pb). For example, the compound including an excessive amount of lithium, which is formed in the charging of the prelithiated anode up to about 100% of an SOC of the anode, may be a lithium silicide compound, $Li_aSi$ (where a>3).

The prelithiated anode may be prepared using a method other than the electrochemical method. For example, lithium may be introduced to an anode including a metal capable of incorporating/deincorporating lithium by physical diffusion.

One or more embodiments will now be described in more detail with reference to the following examples. However, these examples are not intended to limit the scope of the one or more embodiments.

EXAMPLES (Preparation of Topological Quantum Framework Embedded in Nanoparticle Structure)

Example 1

Preparation and Charging of Half-Cell

A single crystal silicon (Si) nanoparticle powder having an average particle diameter of 50 nm, artificial graphite, carbon nanotubes, and a binder were mixed at a weight ratio of 55:35:2:8 and added to N-methylpyrrolidone, a solvent, and then mixed again to prepare an anode active material slurry. The binder was a lithium polyacrylate (Li-PAA). After coating the anode active material slurry on a Cu foil, the slurry was dried in an oven at 80° C. for 1 hour, dried again in an oven at 200° C. for 2 hours, and roll-pressed to prepare a working electrode. A counter electrode was metal lithium. An electrolyte was prepared by dissolving 1.3 M $LiPF_6$ in a solvent mixture including ethylene carbonate (EC), diethyl carbonate (DEC), and fluoroethylene carbonate (FEC) at a volume ratio of 2:6:2. Therefore, an electrochemical cell (a half-cell) was prepared.

The electrochemical cell was charged up to 50% of a state of charge (SOC) of the working electrode.
Preparation and Charging/Discharging of Full-Cell
Preparation of Anode In the electrochemical cell, the working electrode charged up to 50% of the SOC was separated and used as an anode.
Preparation of Cathode $LiNi_{0.6}Co_{0.2}Mn_{0.2}O_2$ as a cathode active material, Denka Black as a carbonaceous conducting agent, and polyvinylidene fluoride (PVdF) were mixed at a weight ratio of 94:3:3 to prepare a mixture, and the mixture was mixed with N-methylpyrrolidone (NMP) in an agate mortar to prepare a cathode active material slurry. The cathode active material slurry was coated at a thickness of about 40 μm on an aluminum current collector having a thickness of 15 μm by using a doctor blade, dried at room temperature, dried again in vacuum at 120° C., and roll-pressed to prepare a cathode having a cathode active material layer disposed on a current collector.
Preparation of a Full-Cell A separator was disposed between the cathode and the anode to prepare an electrode assembly. The electrode assembly thus prepared was put into a pouch, injected with an electrolyte solution, and hermetically sealed, thereby completing the manufacture of a lithium battery. The lithium battery was a pouch cell having a width of 26 mm and a length of 110 mm. The separator was a polyethylene-polypropylene copolymer separator having a thickness of 14 μm. The electrolyte solution was prepared by dissolving 1.3 M $LiPF_6$ in a solvent mixture including ethylene carbonate (EC), diethyl carbonate (DEC), and fluoroethylene carbonate (FEC) at a volume ratio of 2:6:2. An N/P ratio of the anode and the cathode was 1.5.
Charging and Discharging of a Full-Cell The lithium battery (full-cell) thus prepared was charged up to 100% of the SOC of the anode and then discharged up to 100% of the SOC of the cathode. The discharged lithium battery was disassembled to obtain an anode including a composite anode active material containing a topological quantum framework.

Example 2

Framework Including Nanosheet

An anode including a composite anode active material containing a topological quantum framework was obtained in the same manner as used in Example 1, except that a polycrystalline Si nanoparticle powder having an average particle diameter of about 50 nm to about 200 nm and including defects was used instead of the single crystal silicon (Si) nanoparticle powder having an average particle diameter of 50 nm.

Comparative Example 1

Preparation of Anode

A Si nanoparticle powder having an average particle diameter of 50 nm, artificial graphite, carbon nanotubes, and a binder were mixed at a weight ratio of 55:35:2:8, added to NMP, a solvent, and mixed again to prepare an anode active material slurry. The binder was Li-PAA. The anode active material slurry was coated on a Cu foil, dried in an oven at 80° C. for 1 hour, dried again in an oven at 200° C. for 2 hours, and roll-pressed to prepare an anode.
Preparation of Cathode A cathode was prepared in the same manner as used in Example 1.
Preparation of a Full-Cell A separator was disposed between the cathode and the anode to prepare an electrode assembly. The electrode assembly thus prepared was put into a pouch, injected with an electrolyte solution, and hermetically sealed, thereby completing the manufacture of a lithium battery. The lithium battery was a pouch cell having a width of 26 mm and a length of 110 mm. The separator was a polyethylene-polypropylene copolymer separator having a thickness of 14 μm. The electrolyte solution was prepared by dissolving 1.3 M $LiPF_6$ in a solvent mixture including ethylene carbonate (EC), diethyl carbonate (DEC), and fluoroethylene carbonate (FEC) at a volume ratio of 2:6:2. An N/P ratio of the anode and the cathode was 1.1.
Charging and Discharging of Full-Cell The lithium battery (full-cell) was charged up to 90% of an SOC of the anode, discharged up to 90% of an SOC of the cathode, and cut-off at a voltage of 1.5 V vs. lithium. Therefore, an anode including an anode active material was obtained.
(Preparation of Lithium Battery)

Example 3

Preparation of Anode

The anode including an anode active material containing a topological quantum framework prepared in Example 1 was used as it was.

Preparation of Cathode

LiNi$_{0.6}$Co$_{0.2}$Mn$_{0.2}$O$_2$ as a cathode active material, Denka Black as a carbonaceous conducting agent, and polyvinylidene fluoride (PVdF) were mixed at a weight ratio of 94:3:3 to prepare a mixture, and the mixture was mixed with NMP in an agate mortar to prepare a cathode active material slurry. The cathode active material slurry was coated at a thickness of about 40 μm on an aluminum current collector having a thickness of 15 μm by using a doctor blade, dried at room temperature, dried again in vacuum at 120° C., and roll-pressed to prepare a cathode having a cathode active material layer disposed on a current collector.

Preparation of Lithium Battery

A separator was disposed between the cathode and the anode to prepare an electrode assembly. The electrode assembly thus prepared was put into a pouch, injected with an electrolyte solution, and hermetically sealed, thereby completing the manufacture of a lithium battery. The lithium battery was a pouch cell having a width of 26 mm and a length of 110 mm. The separator was a polyethylene-polypropylene copolymer separator having a thickness of 14 μm. The electrolyte solution was prepared by dissolving 1.3 M LiPF$_6$ in a solvent mixture including ethylene carbonate (EC), diethyl carbonate (DEC), and fluoroethylene carbonate (FEC) at a volume ratio of 2:6:2. An N/P ratio of the anode and the cathode was 1.5.

Comparative Example 2

A lithium battery was prepared in the same manner as used in Example 3, except that the anode prepared in Comparative Example 1 was used as an anode, and an N/P ratio of the anode and the cathode was changed to 1.1.

Evaluation Example 1

Transmission Electron Microscope (TEM) Measurement

A high-angle annular dark field (HAADF) scanning transmission electron microscope (STEM) image of the topological quantum framework of a lithium silicide (Li$_x$Si, 0<x<1) having a 3-dimensional porous nanoparticle structure prepared in Example 1 is shown in FIG. 2A. FIG. 2B is a TEM image of the topological quantum framework shown in FIG. 2A. FIG. 2B corresponds to a 2-dimensional perspective view of the 3-dimensional porous nanostructure particle shown in FIG. 2A. In FIG. 2A, the white portions shows frames each formed of a plurality of 1-dimensional nanostructures, and the black portions between the frames each formed of a plurality of 1-dimensional nanostructures are pores. The a plurality of 1-dimensional nanostructures have a diameter of about 1 nm to about 2 nm and the pores have a diameter of about 3 nm. As shown in FIGS. 2A and 2B, the plurality of 1-dimensional nanostructure frames intersect each other and are connected to each other to form the topological quantum framework, and the pores are present between the plurality of 1-dimensional nanostructures frames.

Although not shown in the figures, it was confirmed through electron tomography that a plurality of lithium silicide nanowires disposed on a surface and an inside of the topological quantum framework intersected each other and were connected to each other, which formed a porous structure.

A HAADF STEM image of the topological quantum framework of a lithium silicide (Li$_x$Si (0<x<1)) having a 3-dimensional porous nanostructure particle prepared in Example 2 is shown in FIG. 2C. As shown in FIG. 2C, in the topological quantum framework, a plurality of 2-dimensional nanostructure frames were incorporated between the plurality of 1-dimensional nanostructure frames, where these frames intersected each other and were connected to each other. Pores were present between the plurality of 1-dimensional nanostructure frames, and pores were also present between the plurality of 2-dimensional nanostructure frames. Pores were also present between the plurality of 1-dimensional nanostructure frames and the plurality of 2-dimensional nanostructure frames.

Figure 2D:
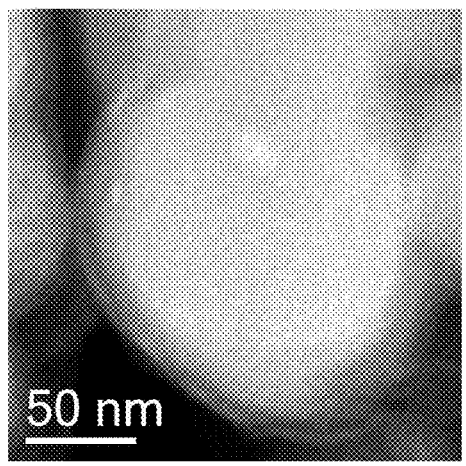
FIG. 2D is a HAADF STEM image of a silicon nanoparticle, which is an anode active material prepared in accordance with Comparative Example 1.

A HAADF STEM image of the silicon nanoparticle as an anode active material prepared by charging and discharging in Comparative Example 1 is shown in FIG. 2D. As shown in FIG. 2D, the silicon nanoparticle maintained a shape of a non-porous silicon nanoparticle.

Figure 3A:
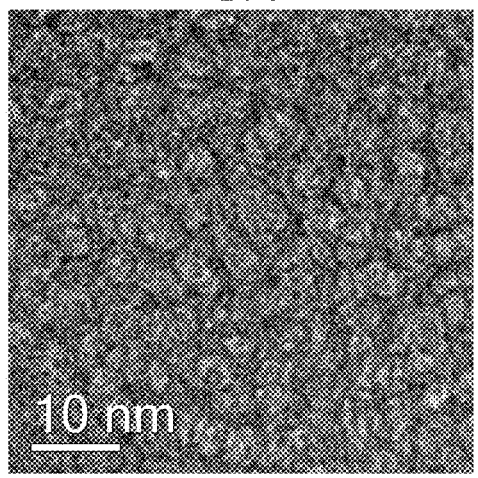
FIG. 3A is a TEM image of an enlarged view of a portion of the topological quantum framework in FIG. 2B.
Figure 3B:
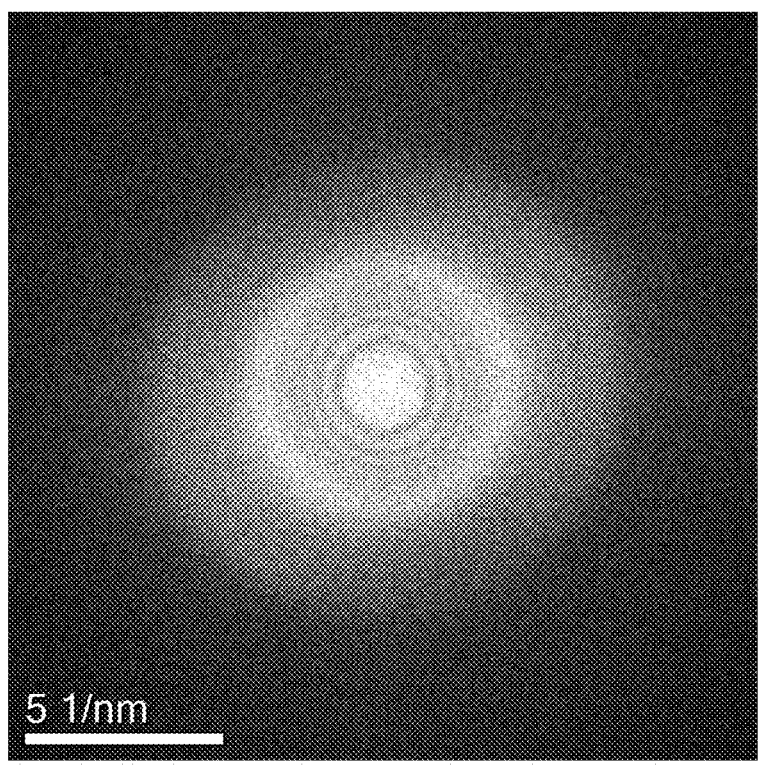
FIG. 3B is a fast fourier transform (FFT) diffractogram that corresponds to the enlarged view in FIG. 3A.

FIG. 3A is an enlarged TEM image of a part of the topological quantum framework shown in FIG. 2B, and FIG. 3B is a fast fourier transformation (FFT) diffractogram that corresponds to the enlarged image in FIG. 3A.

As shown in FIG. 3A, a particular arrangement of atoms was not observed, and as shown in FIG. 3B, a spectrum derived from crystallinity was not observed. Thus, the topological quantum framework of the lithium silicide prepared in Example 1 was confirmed as amorphous.

Figure 4A:
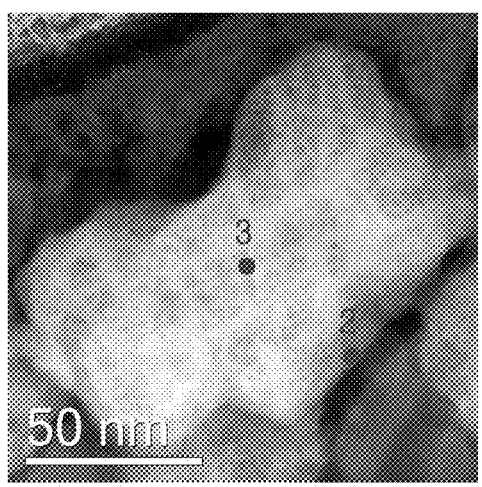
FIG. 4A is a black-and-white HAADF STEM image of a topological quantum framework.
Figure 4B:
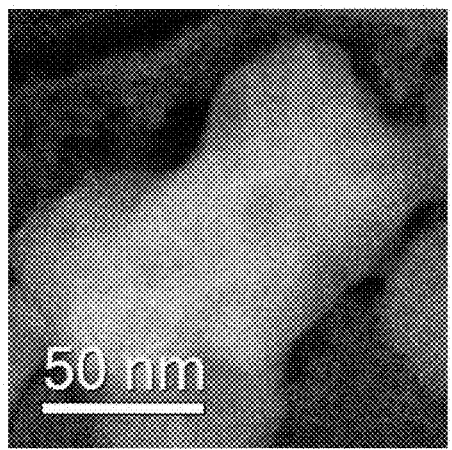
FIG. 4B is a color image showing an element mapping image of FIG. 4A.
Figure 4C:
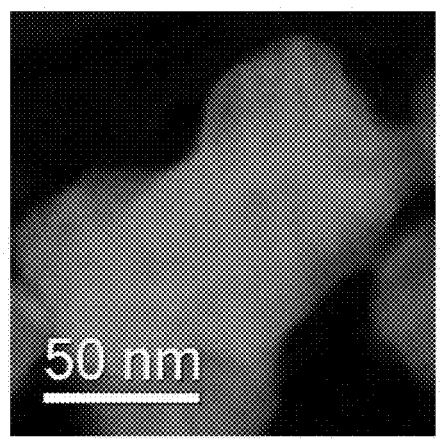
FIG. 4C is an image that shows the distribution of silicon only in FIG. 4B.
Figure 4D:
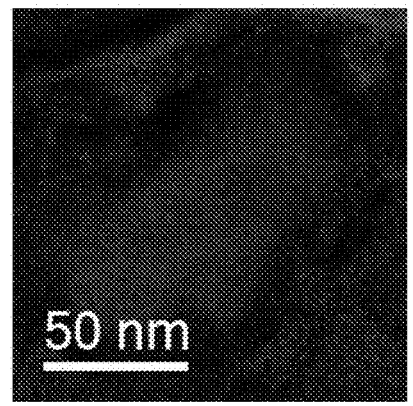
FIG. 4D is an image that shows the distribution of lithium only in FIG. 4B.
Figure 4E:
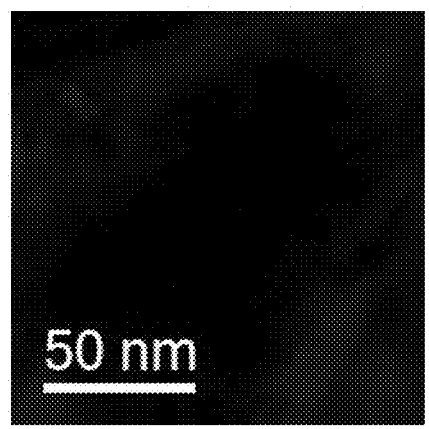
FIG. 4E is an image that shows the distribution of carbon only in FIG. 4B.

FIGS. 4A to 4C are HAADF STEM images of the topological quantum framework in which a plurality of 3-dimensional porous nanostructures are partially overlapped and thus are shown as having a non-spherical shape. Pores are not shown due to the low resolution of the image. FIG. 4A is a black-and-white image of the topological quantum framework, and FIG. 4B is a color image showing an element mapping image of FIG. 4A. In FIG. 4B, green is silicon, red is lithium, and blue is carbon. The image of FIG. 4B was separated into FIGS. 4C, 4D, and 4E according to each element. As shown in FIG. 4C, it was confirmed that silicon is only present in the topological quantum framework. As shown in FIG. 4D, it was confirmed that lithium is present in and around the topological quantum framework. As shown in FIG. 4E, it was confirmed that carbon is only present on a surface of and the outside of the topological quantum framework.

Figure 4F:
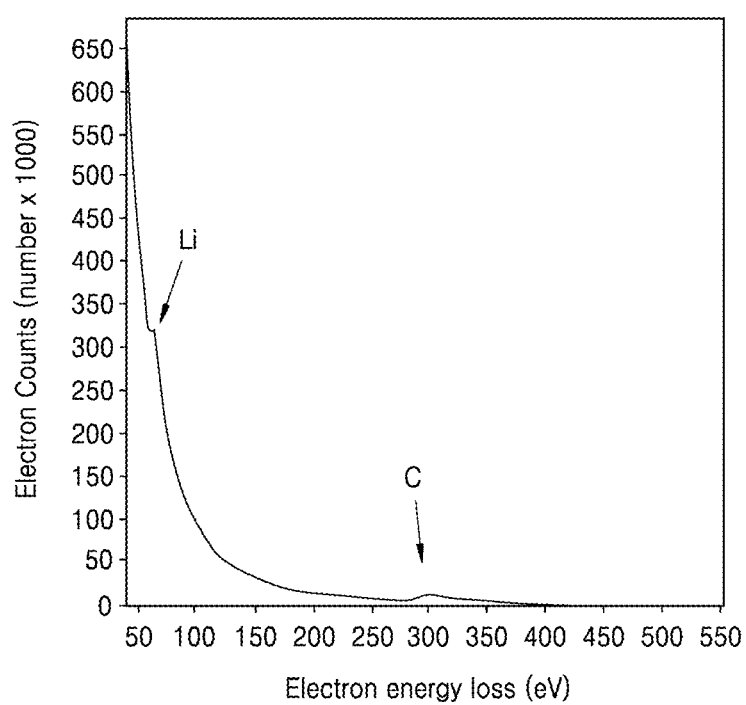
FIG. 4F is a graph of counts (number×$10^3$) versus electron energy loss (electron volts, eV), showing the results of an electron energy loss spectroscopy (EELS) analysis with respect to point 1 in FIG. 4A.
Figure 4G:
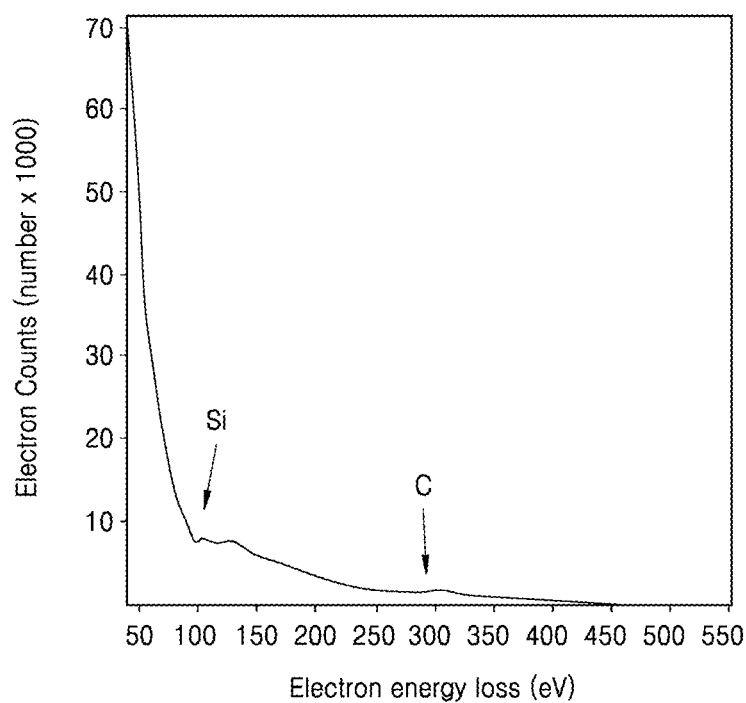
FIG. 4G is a graph of counts (number×$10^3$) versus electron energy loss (electron volts, eV), showing the results of an EELS analysis with respect to point 2 in FIG. 4A.
Figure 4H:
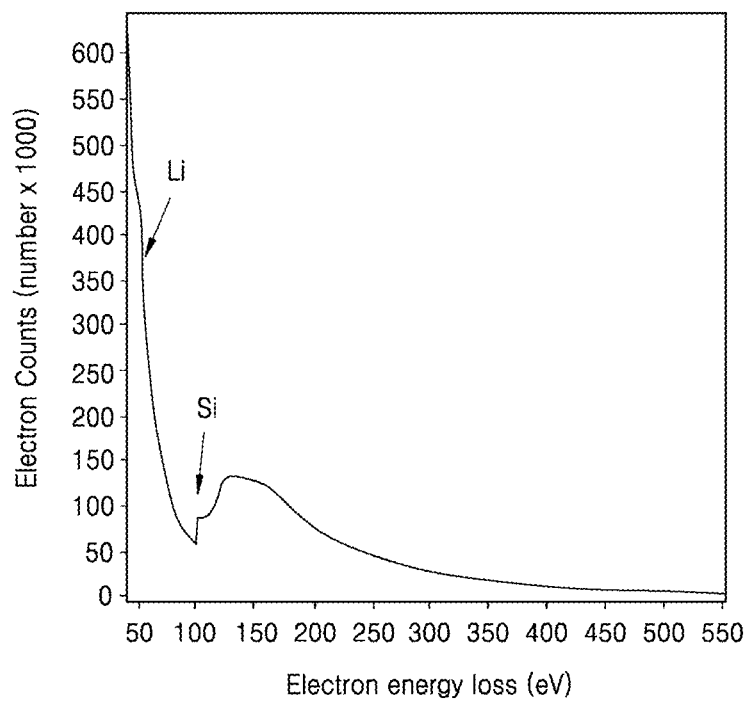
FIG. 4H is a graph of counts (number×$10^3$) versus electron energy loss (electron volts, eV), showing the results of an EELS analysis with respect to point 3 in FIG. 4A.

The results of electron energy loss spectroscopy analysis of points 1, 2, and 3 shown in FIG. 4A are each shown in FIGS. 4F, 4G, and 4H, respectively. Only peaks corresponding to lithium and carbon were detected in FIG. 4F, which shows the result of analysis performed on point 1 that corresponds to a region in FIG. 4A where the topological quantum framework is not present. All peaks corresponding to lithium, silicon, and carbon were detected in FIG. 4G, which shows the result of analysis performed on point 2 that corresponds to a surface of the topological quantum framework of FIG. 4A. Therefore, it was confirmed that a coating layer including carbon was formed on the surface of the topological quantum framework. Accordingly, it was confirmed that a residual lithium compound such as lithium carbonate was present on the surface of the topological quantum framework, which passivated the surface of the topological quantum framework, and thus an electrochemical stability improved during a charging/discharging process. Only peaks corresponding to silicon and lithium were detected in FIG. 4H, which shows the result of analysis performed on point 3 that corresponds to an inside of the topological quantum framework of FIG. 4A. Therefore, it was confirmed that the topological quantum framework was formed of a lithium silicide nanostructure.

Evaluation Example 2

Charging/Discharging Characteristic Evaluation

Lithium batteries prepared in Example 3 and Comparative Example 2 were charged with a constant current of 0.1 C rate at 25° C. until a voltage was 4.2 V (vs. Li). Then, while maintaining the voltage at 4.2 V in a constant voltage mode, the current was cut-off at a current of 0.05 C rate. Next, the batteries were discharged at a constant current of 0.1 C rate until a voltage was 3.0 V (vs. Li). This cycle was repeated 300 times.

In the charging/discharging cycles, the batteries were rested for 10 minutes after each charging/discharging cycle.

Figure 5:
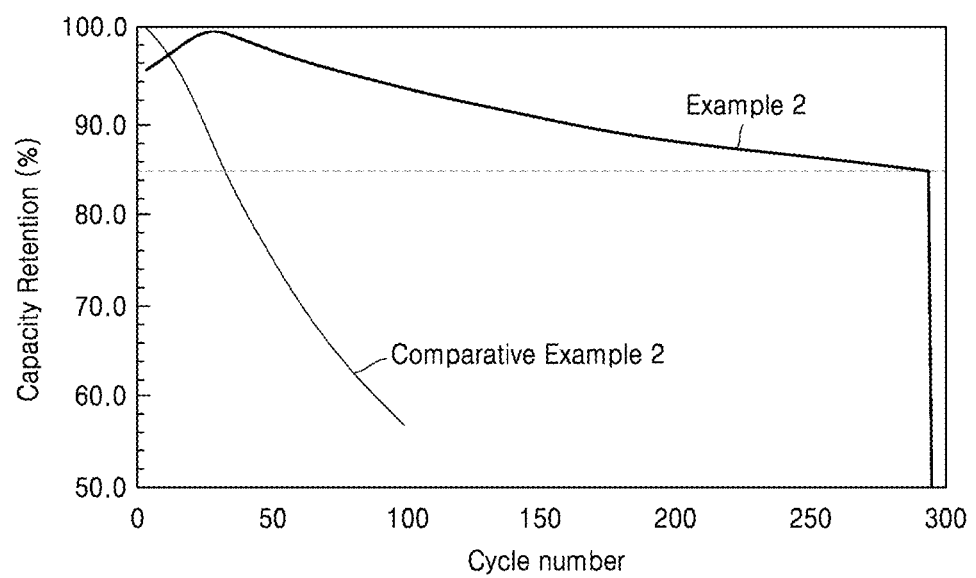
FIG. 5 is a graph of capacity retention (percent, %) versus cycle number that shows the results of a charging/discharging test performed on the lithium batteries prepared in accordance with Example 3 and Comparative Example 2.

The results of the charging/discharging test are shown in Table 1 and FIG. 5. A capacity retention rate at the 100th cycle and a charging/discharging efficiency at the 100th cycle are defined according to Equations 1 and 2, each respectively.

Capacity retention at the 100th cycle [%]=[Discharge capacity at the 100th cycle/discharge capacity at the 1st cycle]×100%  Equation 1

Charging/discharging efficiency at the 100th cycle [%]=[Discharge capacity at the 100th cycle/charge capacity at the 100th cycle]×100%  Equation 2

TABLE 1

| | Capacity retention [%] | Charging/discharging efficiency [%] |
|---|---|---|
| Example 3 | 93 | 99.5 |
| Comparative Example 2 | 56 | 98.4 |

As shown in Table 1, the lithium battery of Example 3 had a significantly increased capacity retention and improved charging/discharging efficiency compared to the lithium battery of Comparative Example 2.

As described above, according to an aspect of one or more embodiments, life characteristics and charging/discharging efficiency of a lithium battery may improve by including a composite anode active material including a topological quantum framework.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A topological quantum framework, comprising:
a plurality of one-dimensional nanostructures disposed in different directions and connected to each other,
wherein a one-dimensional nanostructure of the plurality of one-dimensional nanostructures comprises a first composition comprising a metal capable of incorporating and deincorporating lithium,
wherein the first composition comprises about 0.1 mole to about 1 mole of lithium and about 0.7 mole to about 1.3 mole of silicon, based on one mole of the first composition, and an amount of the silicon in the first composition is greater than an amount of the lithium in the first composition, and
wherein the topological quantum framework is porous.

2. The topological quantum framework of claim 1, wherein a diameter of a one-dimensional nanostructure of the plurality of one-dimensional nanostructures is about 5 nanometers or less.

3. The topological quantum framework of claim 1, wherein a diameter of each one-dimensional nanostructure of the plurality of one-dimensional nanostructures is 5 nanometers or less.

4. The topological quantum framework of claim 1, wherein a one-dimensional nanostructure of the plurality of one-dimensional structures is linear.

5. The topological quantum framework of claim 1, wherein a length direction of a one-dimensional nanostructure in the plurality of one-dimensional nanostructures extends in a direction which is different from a tangent-line direction at a surface of the topological quantum framework, wherein the tangent-line direction corresponds to a tangent on the surface closest to the one-dimensional nanostructure.

6. The topological quantum framework of claim 1, wherein a first one-dimensional nanostructure intersects a second one-dimensional nanostructure.

7. The topological quantum framework of claim 1, wherein each one-dimensional nanostructure of the plurality of one-dimensional nanostructures intersects another one-dimensional nanostructure.

8. The topological quantum framework of claim 1, wherein the topological quantum framework comprises a pore defined by the plurality of one-dimensional nanostructures, and a diameter of the pore is 5 nanometers or less.

9. The topological quantum framework of claim 8, wherein a cross-section of the pore has a shape defined by a first one-dimensional nanostructure disposed in a first direction, a second one-dimensional nanostructure disposed in a second direction, a third one-dimensional nanostructure disposed in a third direction, and a fourth one-dimensional nanostructure disposed in a fourth direction,
wherein the second one-dimensional nanostructure intersects the first one-dimensional nanostructure, the third one-dimensional nanostructure intersects the second nanostructure, and the fourth one-dimensional nanostructure intersects the first one-dimensional nanostructure and the third one-dimensional nanostructure.

10. The topological quantum framework of claim 8, wherein a cross-section of the pore has a shape comprising a circle, an oval, a rectangle, a triangle, a hexagon, a pentagon, or a combination thereof.

11. The topological quantum framework of claim 8, wherein the topological quantum framework comprises a non-periodic and disordered arrangement of the pores, and wherein a shape of the pores is irregular.

12. The topological quantum framework of claim 1, further comprising a first two-dimensional nanostructure disposed between the plurality of one-dimensional nanostructures.

13. The topological quantum framework of claim 12, wherein the first two-dimensional nanostructure intersects a second two-dimensional nanostructure.

14. The topological quantum framework of claim 12, wherein the first two-dimensional nanostructure has a thickness of about 5 nanometers or greater and a length of 20 nanometers or greater.

15. The topological quantum framework of claim 12, wherein the first two-dimensional nanostructure has a same composition as the plurality of one-dimensional nanostructures.

16. The topological quantum framework of claim 1, wherein the topological quantum framework has a porosity of about 50% or greater.

17. The topological quantum framework of claim 1 having a form of porous particles.

18. The topological quantum framework of claim 1, wherein a pore of the topological quantum framework has a spherical cage shape, a sphericity of about 0.7 or greater, and an aspect ratio of about 4 or less.

19. The topological quantum framework of claim 1, wherein a diameter of the topological quantum framework is about 200 nanometers or less.

20. The topological quantum framework of claim 1, wherein the first composition has an amorphous structure.

21. The topological quantum framework of claim 1, wherein the first composition comprises a metal and a Group 14 element having an atomic weight of 20 or greater.

22. The topological quantum framework of claim 1, wherein the first composition is represented by Formula 1:

$$M_xSiQ_y \qquad \text{Formula 1}$$

wherein, in Formula 1, M comprises Li or Li and Fe, Co, Mn, Ni, Au, Ag, Pt, Nb, Mo, V, Re, Ti, Ba, Li, Na, Mg, Ca, Al, or a combination thereof;
Q is C, N, or O; and
$0<x<1$ and $0<y<2$.

23. The topological quantum framework of claim 1, wherein the first composition comprises a lithium silicide.

24. A topological quantum framework comprising:
a plurality of one-dimensional nanostructures disposed in different directions and connected to each other,
wherein a one-dimensional nanostructure of the plurality of one-dimensional nanostructures comprises a first composition comprising a metal capable of incorporating and deincorporating lithium,
wherein the topological quantum framework is porous, and
wherein the first composition comprises a lithium silicide represented by Formula 2:

$$Li_xSi \qquad \text{Formula 2}$$

wherein, in Formula 2, $0<x<1$.

25. The topological quantum framework of claim 1, wherein a band gap of the topological quantum framework is greater than a band gap of a bulk material having the same composition as the topological quantum framework.

26. The topological quantum framework of claim 1, wherein the plurality of one-dimensional nanostructures further comprise a dopant.

27. The topological quantum framework of claim 1, further comprising a coating layer disposed on a surface of the topological quantum framework, wherein the coating layer comprises a residual lithium compound comprising $Li_2CO_3$, $Li_2O$, $Li_2C_2O_4$, LiOH, LiX, $ROCO_2Li$, $HCOLi$, ROLi, $(ROCO_2Li)_2$, $(CH_2OCO_2Li)_2$, $Li_2S$, $LiSO_y$, or a combination thereof,
wherein, in the residual lithium compound,
X is F, Cl, I, or Br;
R is a C1-C20 hydrocarbon group;
x is 0 to 1; and
y is 1 to 4.

28. A composite anode active material comprising a topological quantum framework, wherein the topological quantum framework comprises:
a plurality of one-dimensional nanostructures disposed in different directions and connected to each other, wherein the plurality of one-dimensional nanostructures comprises a first composition comprising a metal capable of incorporating and deincorporating lithium,
wherein the first composition comprises about 0.1 mole to about 1 mole of lithium and about 0.7 mole to about 1.3 mole of silicon, based on one mole of the first composition, and an amount of the silicon in the first composition is greater than an amount of the lithium in the first composition, and
wherein the topological quantum framework is porous.

29. An anode comprising the composite anode active material of claim 28.

30. A lithium battery comprising the anode of claim 29.

31. A semiconductor comprising the topological quantum framework of claim 1.

32. A device comprising the semiconductor of claim 31.

33. An illuminant comprising the topological quantum framework of claim 1.

34. A sensor comprising the topological quantum framework of claim 1.

35. A drug delivery system comprising the topological quantum framework of claim 1.

36. An actuator comprising the topological quantum framework of claim 1.

37. A method of preparing a topological quantum framework, the method comprising:
providing an anode comprising a metal capable of incorporating and deincorporating lithium;
providing a lithium counter electrode and charging the anode to about 20% to about 60% of a theoretical capacity of the anode to prepare a prelithiated anode;
charging the prelithiated anode to about 100% of the theoretical capacity of the anode in a battery comprising the prelithiated anode and a cathode to prepare a lithiated anode; and
discharging the lithiated anode to obtain an electrode comprising the topological quantum framework,
wherein the topological quantum framework comprises:
a plurality of one-dimensional nanostructures disposed in different directions and connected to each other,
wherein a one-dimensional nanostructure of the plurality of one-dimensional nanostructures comprises a first composition comprising a metal capable of incorporating and deincorporating lithium,
wherein the first composition comprises about 0.1 mole to about 1 mole of lithium and about 0.7 mole to about 1.3 mole of silicon, based on one mole of the first composition, and an amount of the silicon in the first composition is greater than an amount of the lithium in the first composition, and
wherein the topological quantum framework is porous.

38. The method of claim 37, wherein a capacity ratio of the anode and a capacity ratio of the cathode are each independently about 1.2 to about 1.6.

39. The method of claim 37, wherein the anode further comprises a Group 14 element.

* * * * *